United States Patent
Rupp

(10) Patent No.: US 9,398,655 B2
(45) Date of Patent: Jul. 19, 2016

(54) ACTUATION OF SEMICONDUCTOR LIGHT-EMITTING ELEMENTS ON THE BASIS OF THE BYPASS STATE OF ADJACENT SEMICONDUCTOR LIGHT-EMITTING ELEMENTS

(71) Applicant: OSRAM GmbH, Munich (DE)

(72) Inventor: Arnulf Rupp, Oberhaching (DE)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 14/398,737

(22) PCT Filed: May 2, 2013

(86) PCT No.: PCT/EP2013/059175
§ 371 (c)(1),
(2) Date: Nov. 4, 2014

(87) PCT Pub. No.: WO2013/164417
PCT Pub. Date: Nov. 7, 2013

(65) Prior Publication Data
US 2015/0108909 A1    Apr. 23, 2015

(30) Foreign Application Priority Data
May 4, 2012   (DE) .......................... 10 2012 207 456

(51) Int. Cl.
*H05B 41/00*   (2006.01)
*H05B 33/08*   (2006.01)

(52) U.S. Cl.
CPC .......... *H05B 33/0827* (2013.01); *H05B 33/083* (2013.01); *H05B 33/0809* (2013.01)

(58) Field of Classification Search
CPC ..................................................... H05B 33/08
USPC ...... 315/291, 307, 188, 193, 308, 312.185 R, 315/200 R, 209 R
See application file for complete search history.

(56) References Cited

U.S. PATENT DOCUMENTS 7,986,107 B2    7/2011   Weaver et al.
8,456,095 B2    6/2013   Huynh
(Continued)

FOREIGN PATENT DOCUMENTS

CN    102349354 A      2/2012
DE    102010040266 A1  9/2011
(Continued)

OTHER PUBLICATIONS

International Search Report dated Sep. 16, 2013.
(Continued)

*Primary Examiner* — Minh D A
(74) *Attorney, Agent, or Firm* — Viering, Jentschura & Partner mbB

(57) ABSTRACT

A circuit for actuating semiconductor light-emitting elements, wherein the circuit is supplied by a rectified mains voltage, may include at least two series-connected segments, which each have one or more series-connected semiconductor light-emitting elements, wherein the semiconductor light-emitting elements in at least two of the segments are different, which results in different forward voltages of the segments, and in each case one driver for actuating a segment, wherein the driver has at least one electronic switch, by means of which the segment may be bypassed, wherein the circuit arrangement is designed to decide to bypass the segment assigned to the circuit arrangement, on the basis of an instantaneous value of the rectified mains voltage and on the basis of the bypass state of the adjacent segments.

18 Claims, 19 Drawing Sheets

(56) References Cited

U.S. PATENT DOCUMENTS

| | | |
|---|---|---|
| 2007/0257623 A1 | 11/2007 | Johnson et al. |
| 2008/0315778 A1* | 12/2008 | Tatsukawa .................... 315/193 |
| 2009/0179575 A1 | 7/2009 | Mednik et al. |
| 2009/0230883 A1 | 9/2009 | Haug |
| 2010/0134018 A1 | 6/2010 | Tziony et al. |
| 2010/0181923 A1 | 7/2010 | Hoogzaad |
| 2010/0308739 A1* | 12/2010 | Shteynberg et al. .......... 315/193 |
| 2011/0127919 A1 | 6/2011 | Lin |
| 2011/0210670 A1 | 9/2011 | Sauerlander et al. |
| 2011/0210674 A1 | 9/2011 | Melanson |
| 2011/0248640 A1 | 10/2011 | Welten |
| 2011/0316432 A1 | 12/2011 | Lee |
| 2012/0001558 A1 | 1/2012 | Vos |

FOREIGN PATENT DOCUMENTS

| | | |
|---|---|---|
| WO | 2010103480 A2 | 9/2010 |
| WO | 2011070482 A2 | 6/2011 |
| WO | 2012034102 A1 | 3/2012 |

OTHER PUBLICATIONS

Office Action dated Mar. 1, 2013 issued in parallel German application.

Office Action dated Jan. 25, 2013 issued in parallel German application.

Chinese Office Action based on Application No. 201380023612.6(7 Pages and 5 pages of English translation) dated Dec. 2, 2015 (Reference Purpose Only).

\* cited by examiner

ACTUATION OF SEMICONDUCTOR LIGHT-EMITTING ELEMENTS ON THE BASIS OF THE BYPASS STATE OF ADJACENT SEMICONDUCTOR LIGHT-EMITTING ELEMENTS

RELATED APPLICATIONS

The present application is a national stage entry according to 35 U.S.C. §371 of PCT application No. PCT/EP2013/059175 filed on May 2, 2013, which claims priority from German application No.: 10 2012 207 456.2 filed on May 4, 2012, and is incorporated herein by reference in its entirety.

TECHNICAL FIELD

Various embodiments generally relate to a circuit for actuating semiconductor light-emitting elements and to a lamp, a luminaire or a light-emitting system including such a circuit.

BACKGROUND

It is known to operate an LED module including a plurality of light-emitting diodes by means of a single-stage or multi-stage switched mode power supply, which is connected upstream of the LED module. If the LED module has a power range of greater than 25 W, power factor correction (PFC) is additionally required. At low electric powers, a linear regulator is generally used.

Above certain light or power classes, in which, for example, a multiplicity of LEDs are intended to be operated in one module or in a plurality of LED modules, circuit arrangements are known in which many LED chips are connected in series. The forward voltage of this series circuit can in this case be of the order of magnitude of the mains voltage.

In a simple embodiment, series-connected LEDs are operated directly on the AC voltage grid. This results in severe light modulation, so-called "flicker", and energy-inefficient utilization of the LEDs. For higher power classes, this approach furthermore results in problems associated with normative standards in respect of power factor and harmonics.

Furthermore, it is known to connect a rectifier upstream of the series circuit including LEDs. This is also associated with the abovementioned problems.

In addition, it is known to change the circuitry of the LED series circuit synchronously in time with the mains voltage modulation.

Thus, DE 10 2010 040 266 A1 discloses an LED luminaire including an integrated circuit, a rectifier and a series of series-connected LEDs, which are operated via a rectified AC signal. The integrated circuit has power switches which can short-circuit individually and in a targeted manner a corresponding group of different groups of LEDs in an LED series across which the rectified AC signal is present. If the voltage across the series increases, the integrated circuit controls the power switches in order to increase the number of LEDs through which current flows, while the integrated circuit controls the power switches when the voltage across the sequence decreases in order to reduce the number of LEDs through which current flows.

The document WO 2012/034102A1 describes a system for actuating LEDs directly from a rectified mains voltage with the aid of switches, which bypass groups of LEDs depending on the instantaneous mains voltage.

SUMMARY

Various embodiments provide an efficient possibility for actuating semiconductor light-emitting elements.

A circuit for actuating semiconductor light-emitting elements is proposed, wherein the circuit is supplied by a rectified mains voltage, including at least two series-connected segments, which each have one or more series-connected semiconductor light-emitting elements, wherein the semiconductor light-emitting elements in at least two of the segments are different, which results in different forward voltages of the segments, including in each case one driver for actuating a segment, wherein the driver has at least one electronic switch, by means of which the segment can be bypassed, wherein the circuit arrangement or each driver is designed to decide to bypass the segment assigned to the circuit arrangement or each driver, on the basis of an instantaneous value of the rectified mains voltage and on the basis of the bypass state of the adjacent segments. This measure ensures optimized actuation of the semiconductor light-emitting elements, wherein not even the rectified mains voltage needs to be measured explicitly for the actuation. The decision to bypass the assigned segment results purely from the switching state of the remaining segments and a reference voltage.

One development consists in that the segment with the lower forward voltage is arranged within the series circuit closer to a reference point of the circuit. This has the advantage that the optimum actuation method results entirely on its own owing to the instantaneous value of the mains voltage which is continuously increasing or falling.

In various embodiments, each driver has a peak value detector, which stores the present forward voltage of the segment. This results in simplified decision identification for the respective driver. If each driver has a base point, whose potential is dependent on the value of the forward voltage of the segment which is stored in the peak value detector, the bypass decision can be realized in a particularly simple manner. Alternatively, the forward voltage can also be held by a reference voltage as comparison value or stored, for example, in a value table of a microcontroller.

In various embodiments, the driver includes a comparison element, as a result of which each driver switches over the segment assigned thereto whenever the potential difference between the base point and a threshold voltage input into the driver changes its mathematical sign. This simple comparison operation is sufficient for the optimum operation of the semiconductor light-emitting elements.

A development consists in an individual threshold voltage being assigned to each driver. Thus, the mode of operation of the semiconductor light-emitting elements can take place in such a way that all of the semiconductor light-emitting elements are operated, on average over time, at the same electrical power.

In a further configuration, the sums of all possible combinations of the forward voltages of subsets of all segments and the forward voltages of the individual segments always result in different values. This favors optimized actuation of the semiconductor light-emitting elements.

In a development of this configuration, the forward voltages of the series-connected segments double in each case, starting from the segment with the lowest potential, based on the reference point. This arrangement can be particularly advantageous for the actuation of all of the semiconductor light-emitting sources by virtue of actuation in accordance with the disclosure and realizes an equidistant interval between the forward voltages that can be realized combinatorially.

In a further embodiment, a switchover of a segment which has a greater potential difference than the reference point effects a switchover of at least one segment which has a lower potential difference than the reference point. This configuration enables a binary-counter-like switching scheme which enables a particularly optimum mode of operation, in interaction with the binary arrangement of the chain lengths of the semiconductor light-emitting elements. In particular, bypassing of a segment which has a greater potential difference than the reference point effects safety isolation of the adjacent segment, which has a lower potential difference than the reference point, and vice versa.

In a further configuration, the segments are connected in series with a current regulator. As a result, the sudden voltage changes during bypassing of individual chains can be compensated for easily and there are no sudden current changes which would ultimately impair the life of the light-emitting elements. In particular, the current regulator has a resistive element or a linear regulator.

A further configuration consists in the electronic switch of the driver with the greatest potential difference with respect to the reference point being active with a switching frequency which corresponds to twice the mains frequency, and the electronic switches of the further stages being active at a switching frequency which is a multiple of twice the mains frequency. This favors as little variance as possible in the average light-emitting duration of the semiconductor light-emitting elements.

A further configuration consists in a buffer capacitor being connected in parallel with semiconductor light-emitting elements of at least one segment, wherein a decoupling diode is arranged in series with the at least one segment, and the electronic switch being arranged in parallel with the series circuit including the segment and the decoupling diode, with the result that the decoupling diode prevents the discharge of the buffer capacitor via the electronic switch. The buffer capacitor effects a longer light-emitting duration of the connected chain of semiconductor light-emitting elements, which results in improved light quality with a lesser flicker component. Alternatively, at least one of the drivers may have a series circuit including a capacitor and a diode, wherein this series circuit is arranged in parallel with the semiconductor light-emitting elements of the segment which is actuated by the driver. This capacitor acts as peak value detector by virtue of its storing the present forward voltage of the parallel-connected chain.

In a further configuration, the driver includes an electronic short-circuiting switch, by means of which the segment assigned to the driver can be short-circuited, wherein the base connection of the short-circuiting switch is connected to the collector connection of an electronic comparison switch via a first current-limiting element, wherein the emitter connection of the comparison switch is connected to a connection of the segment, to which the driver is assigned, wherein the base connection of the comparison switch is connected to a terminal of the rectified AC mains voltage. This measures makes it possible to construct a particularly simple and inexpensive circuit which nevertheless demonstrates optimum operation of the connected semiconductor light-emitting elements.

The driver may be a circuit arrangement which can be used for actuating a segment.

The drivers are therefore operated by a rectified mains voltage in the form of a pulsating DC voltage. In this case, it is advantageous that the rectification of the AC mains voltage does not need to provide any stores, for example a capacitor. In particular, it is not necessary for a smoothing electrolytic capacitor to be provided which is designed for the total level of the mains voltage. This reduces the susceptibility to faults and enables a more compact design of the circuit.

A switching function may be actuated electronically by means of the electronic switch. The electronic switch may include a transistor, a MOSFET, an operational amplifier, a comparator or a component part to which a switching function can be applied.

The semiconductor light-emitting elements are, for example, LEDs, LED chips or LED modules. A semiconductor light-emitting element may also include at least one OLED (organic light-emitting diode) or a module including at least one OLED.

An advantage of the buffer capacitor consists in that the buffer capacitor can be designed correspondingly for a lower voltage than the (rectified) mains voltage. Thus, the buffer capacitor has a smaller physical shape and is subject to less loading. For example, the buffer capacitor can be designed for the level of the voltage drop across the segment, which voltage drop is much lower than the mains voltage or the voltage drop across all of the segments owing to the series circuit of the segments.

In particular, the buffer capacitor may also be arranged in parallel with only some of the semiconductor light-emitting elements of the segment.

One embodiment consists in that the buffer capacitor is arranged in or together with that driver which actuates the segment with the greatest forward voltage.

It is also possible for in each case one such buffer capacitor to be arranged in a plurality of drivers, wherein it is preferably those drivers which actuate the segments of the plurality of segments whose semiconductor light-emitting elements have the greatest forward voltages.

Another configuration consists in that the buffer capacitor is designed to be replaceable via a detachable connection.

In particular, this buffer capacitor can be arranged at a different location than the circuit via the detachable connection. Thus, the buffer capacitor can be replaced easily via the detachable connection. A further configuration consists in a decoupling diode being arranged between in each case two segments, wherein the electronic switch is arranged in parallel with the series circuit including the segment and the decoupling diode. The decoupling diode thus prevents the discharge of the buffer capacitor via the electronic switch.

A further configuration consists in that at least one of the drivers has a series circuit including a capacitor and a diode, wherein this series circuit is arranged in parallel with the semiconductor light-emitting elements of the segment actuated by the driver.

The series circuit including the capacitor and the diode is a peak value detector for the respective segment.

A development consists in that the drivers are coupled to the rectified mains voltage via at least one voltage source.

An additional configuration consists in that each driver is coupled to the rectified mains voltage via a separate voltage source.

One development consists in that the at least one voltage source can be realized by means of:
  a voltage divider;
  an auxiliary voltage source;
  a zener diode.

A further possibility consists in that the voltage source is actuable depending on an average value of the rectified mains voltage.

Thus, a relationship with the average mains voltage can be established using the (controllable) voltage source. Using the voltage sources for the plurality of drivers, it is possible to control, for example to balance, the currents for the semiconductor light-emitting elements of the segments.

For example, longer-term averaging over a mains period or over several mains periods of the mains voltage can take place. The (longer-term) averaging can take place depending on a peak value, an average value or the like. In this case, the mains voltage can already be rectified or it may be an AC mains voltage.

Another development consists in that the drivers can be supplied with a rectified mains voltage.

A development consists in that at least two of the segments have semiconductor light-emitting elements, which differ at least partially in terms of their forward voltages, their colors, their sizes, their physical shapes and/or their numbers. The forward voltages of all of the segments are preferably different.

Another development consists in that the driver includes a comparison element.

The comparison element may be or include a comparator, for example. The comparison element can be in the form of an (at least one) operational amplifier or in the form of at least one transistor.

The comparison element compares a first reference potential, for example a side of the rectified mains voltage, with a second reference potential, for example a potential at the end or in the respective segment.

Using the current regulator, the current in the segments can be preset. A preset voltage drop, for example the voltage which does not form as a voltage drop across the series-connected semiconductor light-emitting elements, can form across the current regulator.

The current regulator can itself set a current or it can be used to set a current.

Another development consists in that the current regulator is controllable by means of dimming.

One option consists in the current regulator being controlled and therefore luminosity regulation (dimming) of the semiconductor light-emitting elements being achievable. The actuation can take place in different ways, for example via a potentiometer, a DALI system, a microcontroller or a 1-10 V interface.

Within the scope of an additional development, the segment with the greatest forward voltage has a forward voltage which is at least twice as great as the segment with the lowest forward voltage.

For example, the segment with the greatest forward voltage can have a forward voltage that is at least 60% greater than the segment with the second greatest forward voltage.

Another development consists in that the electronic switch of the driver is active at a switching frequency which has at least twice the mains frequency or a multiple of the mains frequency. Switching frequency will be understood below to mean the average frequency of the switch-on and switch-off operations of the switch. A switch-on and subsequent switch-off operation in this case results in a full wave. In this case, the switch-on duration and the switch-off duration can be of different lengths, and the switching frequency results from the average frequency of the switch-on and switch-off operations of the switch.

In particular, the switch of that driver which actuates the segment with the greatest forward voltage can be operated at a switching frequency of at least 100 Hz.

A further configuration also consists in that a device for mixing the light provided by a plurality of segments is provided.

For example, an optical element can be provided, which is used to mix light emitted by a plurality of semiconductor light-emitting elements.

For example, the short-circuiting switch is a pnp transistor, and the comparison switch is an npn transistor. Correspondingly, in a dual embodiment with respect to this, pnp and npn transistors can also be embodied in inverted form, with corresponding potential matching. Other electronic switches, for example IGBTs, MOSFETs, or the like can also be provided as switches.

A comparison between the potential at the respective segment (for example a comparison point within the LED chain) and the potential of the present rectified mains half wave takes place on the base-emitter path of the comparison switch. Correspondingly, actuation of the respective segment by the driver can take place depending on the level of the rectified AC mains voltage.

Optionally, the base connection of the comparison switch can be connected to a terminal of a voltage source, which voltage source represents an offset voltage with respect to the potential of the rectified AC mains voltage.

The abovementioned object is also achieved by a lamp, a luminaire or a light-emitting system including a circuit as described herein.

The lamp, luminaire or light-emitting system can be an LED light source.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 1:
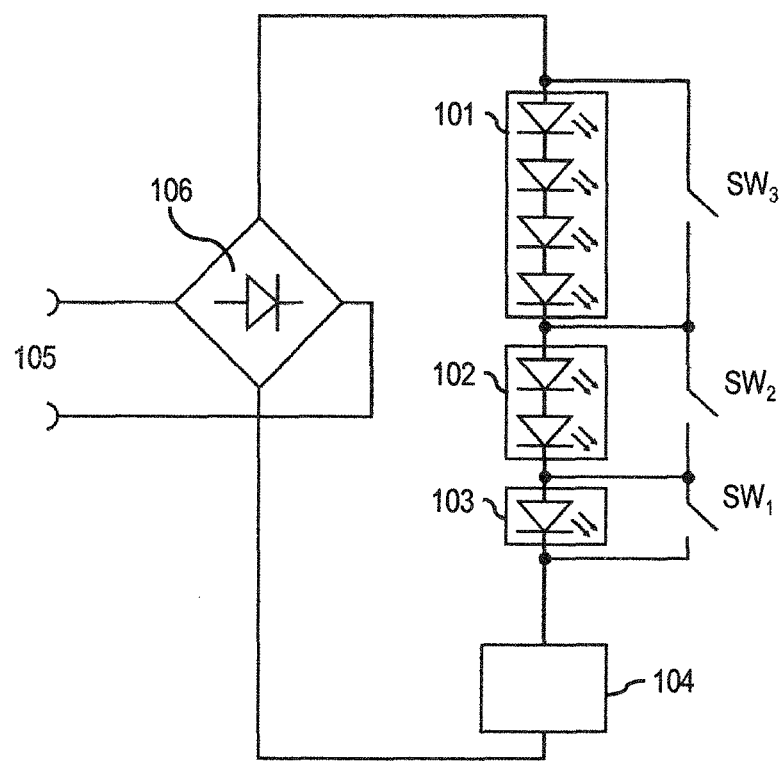
FIG. 1 shows, in order to illustrate the technical field, a schematic circuit arrangement for actuating three LED segments, wherein the individual LED segments have a different number of LEDs and the LED segments can each be bypassed or short-circuited by means of an electronic switch arranged in parallel.

The following detailed description refers to the accompanying drawing that show, by way of illustration, specific details and embodiments in which the disclosure may be practiced.

Operation of an LED Chain on a Mains Voltage

An LED chain includes a plurality of segments (LED segments), which are connected in series with one another. Further component parts can possibly be arranged between the LED segments. Each LED segment can have a multiplicity of LEDs, which are connected in series with one another.

A mains voltage denotes an AC voltage as is provided by an electrical supply grid, for example. The mains voltage can be converted into rectified mains voltage half-waves (also referred to as "half-waves" or "pulsating mains voltage") via a rectifier. The rectifier can be configured as a half-wave or a full-wave rectifier.

Combinatorial possibilities of the forward voltages corresponding to the LED segments are used for actuating the series-connected LED segments. A forward voltage results corresponding to the number of LEDs connected in series in a segment. Owing to different numbers of series-connected LEDs, different forward voltages result for different LED segments. The number of LED segments is denoted below by M.

The observation is made here that different LEDs of the same or different types (for example different LED modules and/or LEDs with different colors) can be connected in series. It is also possible for individual LEDs to include a parallel circuit of at least one semiconductor light-emitting element.

Electronic switches which short-circuit individual or a plurality of LED segments can be provided in parallel with at least one LED segment, in particular in parallel with a plurality of LED segments. By actuating the electronic switches, it is possible to achieve a situation whereby the voltage at the LED segments $U_{LED}(t)$ follows (or tracks) the rectified mains voltage $U_{in}(t)$ (i.e. the abovementioned half waves):

$$U_{LED}(t) = U_{LED}(t_i, I) = U_i(I),$$

wherein $U_i(I)$ is a total voltage of the unbypassed LEDs for the switching state i at a current I.

In this case, the LED segments are preferably different, i.e. have forward voltages which are at least partially different than one another. In particular, at least two of the LED segments have different numbers and/or types of LEDs. In other words, not all of the LED segments are populated with the same number of LEDs of the same type with the same circuitry. Therefore, the individual LED segments are activated or deactivated at different times (during the characteristic of the rectified mains voltage) and possibly also with a different frequency per mains period, i.e. are operated at a different frequency.

It is also possible to use frequencies which are higher than the mains frequency for actuating the switches (for bypassing the LED segments). This results in a multiplicity of combinable switching states for actuating the different switches. The number of possible switching states N is therefore substantially greater ($2^M$) than the number of LED segments M.

The tabular representation below shows, by way of example, possible combinations in an arrangement with three LED segments, where i is the switching state, $SW_m$ is the switch, where m=1 to 3, 0 is an open switch, 1 is a closed switch, $U_{f1}(I)$ to $U_{f3}(I)$
  is a forward voltage of the unbypassed LEDs at the current I for the LED segments 1 to 3.

| i | $SW_1$ | $SW_2$ | $SW_3$ | $U_i(I)$ |
|---|---|---|---|---|
| 1 | 1 | 1 | 1 | |
| 2 | 0 | 1 | 1 | $U_{f1}(I)$ |
| 3 | 1 | 0 | 1 | $U_{f2}(I)$ |
| 4 | 0 | 0 | 1 | $U_{f1}(I) + U_{f2}(I)$ |
| 5 | 1 | 1 | 0 | $U_{f3}(I)$ |
| 6 | 0 | 1 | 0 | $U_{f1}(I) + U_{f3}(I)$ |
| 7 | 1 | 0 | 0 | $U_{f2}(I) + U_{f3}(I)$ |
| 8 | 0 | 0 | 0 | $U_{f1}(I) + U_{f2}(I) + U_{f3}(I)$ |

The residual voltage $$U_{in}(t) - U_{LED}(t)$$

forms as a voltage drop across a current regulator. A multiplicity of different total forward voltages can be realized for the LED chain with a plurality of LED segments with different (many) series-connected LEDs, with the result that this total voltage comes very close to the present mains voltage. The residual voltage is therefore low in comparison with the mains voltage.

Owing to this low residual voltage, the current regulator can be embodied for example as a linear regulator which is simple and inexpensive to implement. The current regulator can also be configured in such a way that the current follows the mains voltage in a (virtually) ideal manner, with the result that a power factor of the circuit is close to 1.0 and no (notable) harmonics occur.

In the extreme case, the current regulator can even be dispensed with, for example if the dynamics of the LED characteristic in the case of limited current modulation is sufficient to fill the intervals between the switching stages.

Possible dimensioning of the LED segments consists in that a first LED segment has a number A of series-connected LEDs, another (next) LED segment has a number A/2, a further LED segment has a number A/4, etc. If, for example, an index m characterizes an LED segment, this relationship can be represented by $$A_m = A_{m+1}/2,$$

where m=1 . . . M denotes the different M LED segments.

If it is assumed for the sake of simplicity that the LED voltage $U_i(I)$ is current-independent, i.e.

$$U_i(I) \sim U_i(I_{rated}),$$

this configuration results in equidistant voltage values. This arrangement is favorable, but not absolutely optimum, since the density of the switching states at the current maximum for the power loss plays a greater role than in the region of the current zero crossings.

FIG. 1 illustrates the above-described relationship using a schematic circuit arrangement for actuating three LED segments 101, 102 and 103, wherein the LED segment 101 has a series circuit including four LEDs, the LED segment 102 has a series circuit including two LEDs and the LED segment 103 has a single LED. The LED segment 101 can be bypassed using a switch $SW_3$ arranged in parallel therewith, the LED segment 102 can be bypassed using a switch $SW_2$ arranged in parallel therewith, and the LED segment 103 can be bypassed using a switch $SW_1$ arranged in parallel therewith. The switches $SW_1$ to $SW_3$ are in the form of electronic switches, for example transistors or field-effect transistors, which are actuated by a control unit (not illustrated in FIG. 1).

The LED segments 101 to 103 are connected in series with one another and with a current regulator 104. The current regulator 104 may be a resistive element, in particular a linear regulator. Alternatively, it is also possible for the current regulator 104 to be an active current regulator.

One option consists in that the current regulator is controlled and therefore luminosity regulation (dimming) of the light-emitting diodes can be achieved. The actuation can take place in different ways, for example using a potentiometer, a DALI system or a 1-10 V interface.

An AC mains voltage 105, for example 230 VAC, is converted into a pulsating mains voltage via a rectifier 106 and connected to the series circuit including the LED segments 101 to 103 and the current regulator 104. A current I(t) which varies over time flows in the series circuit. There is a forward voltage drop $U_{f3}$ across the LED segment 101, a forward voltage drop $U_{f2}$ across the segment 102 and a forward voltage drop $U_{f1}$ across the LED segment 103 if the respective LED segment is not bypassed by means of the assigned parallel switch $SW_1$ to $SW_3$.

Secondary Conditions for Optimizing the Switching Operations

By way of example, the number of LEDs per segment can be determined or preset as a first variable, and the switching frequency of the electronic switches for bypassing the LED segments can be determined or preset as a second variable. These two variables can be optimized by means of two or three of the secondary conditions explained below. Preferably, the secondary conditions are met for the entire operating voltage range or at least for a large proportion of the operating voltage range.

The first two secondary conditions (A) and (B) are as follows:

(A) An interruption-free current flow (without harmonics) is achieved when $$U_{in}(t) - U_{LED}(t) \geq U_p(t) \quad (1)$$

is met, where $U_p$ is the sum of the parasitic voltage drops in rectifier diodes, switches, etc.

(B) Minimization of the power loss is achieved when $$INT(0 \ldots T)[(U_{in}(t) - U_{LED}(t)) * I(t)] \Rightarrow \text{minimal} \quad (2)$$

is met, where
INT (0 ... T) [ ... ] corresponds to an integral over a mains period.

A further optimization condition (C) is included when the ratio of the average currents in the different LED segments is of significance, i.e., for example, the current density in all of the LEDs is intended to be the same. This applies in particular when this relationship of the average currents is intended to be maintained over the entire operating voltage range.

(C) A desired relationship between the currents in the LED segments is achieved when $$INT(0 \ldots T)[I(t) * SW_m(t)]/(I_{set,m} * T) = 1 \text{ for every } m \quad (3)$$

is met, where
$SW_m(t)$ denotes a switching rhythm (0: switch is closed; 1: switch is open) for the segment m for time t, and
$I_{set,m}$ denotes a desired current for the LED segment m.

An alternative to the secondary condition (C) would be when the light from all of the LED segments were to be mixed in such a way that differences in luminosity do not play a (significant or perceivable) role. In this case, the secondary condition (C) can be dispensed with.

It is also possible to design the LED chip sizes and the intervals between the chips in the LED segments to be different so that the current densities in the LED segments are matched to the average current of the respective LED segment.

The secondary condition (C) is advantageous in particular when different types or sorts (for example colors) of LEDs are contained in the LED segments and the actuation of the switches (switching rhythm per segment i) is used to distribute the power as required. Possible applications represent electronic calibration of the color locus, tracking of a white point over the life and modules with an adjustable white point.

By way of example, it will be assumed below, for reasons of clear representation, that the switching stages i for a specific current I are sorted in increasing order according to the LED voltage $U_i(I)$.

Solution Strategy for the Secondary Conditions (A) and (B)

The secondary conditions (A) and (B) are met optimally when
in the $1^{st}$ and $3^{rd}$ quadrants of the mains voltage, i.e. when the mains voltage is increasing, the change from the switching state i to the next switching state i+1 takes place when the secondary condition (A) for the switching state i+1 is just met, and
in the $2^{nd}$ and $4^{th}$ quadrants of the mains voltage, i.e. when the mains voltage is decreasing, the change from the switching state i to the next switching state i−1 takes place precisely when the secondary condition (A) for the switching state i is just no longer met.

This switching scheme can be achieved, for example, by means of a microcontroller using an analog-to-digital converter (A/D converter). Alternatively, circuits (see further below) can be provided which manage without a microcontroller and can be realized in a particularly inexpensive manner.

For an ideal sinusoidal mains voltage $$U(t) = U_0 * \sin(w\, t),$$

the switching time would be $$t_i = \arcsin(U_i(I(t))/U_0)/w \quad (4),$$

where
$w = 2*pi*f$ denotes the mains frequency (also abbreviated by the lower case Greek letter omega), and
I(t) denotes the impressed current of the current regulator.
With the simplifying assumption that $$U_i(I) \sim U_i(I_{rated}) = U_i$$

the following is true $$t_i = \arcsin(U_i/U_0)/w \quad (5).$$

The values $t_i$ from equation (5) can be stored, for example, in the form of a value table for time control, for example in an inexpensive microcontroller or an application-specific integrated circuit (ASIC).

Solution Strategy for the Secondary Condition (C)

The secondary condition (C) can be met or improved, for example, by means of the measures illustrated below:
(i) when the mains voltage is increasing (in the $1^{st}$ and $3^{rd}$ quadrants), switching times are delayed in a targeted manner:

$$t_i' = t_i + dt_i,$$

so that the currents are distributed as desired. In the case of a decreasing mains voltage (in the $2^{nd}$ and $4^{th}$ quadrants), the switching times are brought forward so that the secondary condition (C) is met more easily.
(ii) The waveform of the impressed current I(t) of the current regulator is modified in such a way that the secondary condition (C) is met more effectively.
(iii) The numbers of LEDs per LED segment are determined in such a way that the secondary condition (C) is met more effectively.

The measure (i) can generally completely meet the secondary condition (C), but has the disadvantage that the secondary condition (B) is thus (slightly) impaired. Overall, this can result in a slightly increased power loss.

The values $dt_i$ are preferably the subject of a numerical optimization as a function of the average input voltage $U_{in}$.

The values $t_i'$ can be stored, for example, in a memory of a microcontroller for all input voltages $U_{in}$.

The measure (ii) is limited, for example, by presets in respect of the power factor and the harmonics. This restriction is dependent on the power class (for example greater than or less than 25 W) in accordance with the relevant standards. A current component with the frequency of the third mains harmonic is permitted within certain limits in the standards and possibly also has a positive effect on the secondary condition (C).

The measure (ii) can be achieved, for example, by modification of the actuation of the current regulator 104. For example, the third harmonic of the current could be introduced or varied as a function of the average mains voltage. The design of the control can take place, for example, via a numerical optimization.

The measure (iii) can be optimized for only one operating voltage point.

For example, the measures (iii) and possibly also (ii) can be optimized for the rated voltage. With the measure (i), correction over the entire operating voltage range can then take place.

More Specific Details, by Way of Example

An ideal delay to the switching time $dt_i$ may possibly not be determined purely analytically and, where possible, is also not unique.

There are more switching times $dt_i$ than LED segments. There are therefore more manipulated variables than are required for meeting the secondary conditions. The optimization problem can be solved numerically as a nonlinear optimization problem in accordance with the secondary condition (C) taking into consideration (adhering to) the secondary condition (A). In this case, the secondary condition (B), as explained above, can be infringed to a certain extent.

For example, the sum of the squares of the errors, i.e. deviations of the segment currents from the respective setpoint current of the LED segment, can be used as an optimization variable $E_{err}(U_{in}, t_i')$.

A specific example of such an optimization task is taken into consideration below. A four-stage arrangement (four LED segments) having the following parameters is assumed: the first LED segment has 6 series-connected LEDs, the second LED segment has 12 series-connected LEDs, the third LED segment has 24 series-connected LEDs, and the fourth LED segment has 51 series-connected LEDs. Furthermore, the following relationships apply:
forward voltage per LED: $U_f=3.2$ V (at the rated current $I_{rated}$)
parasitic voltage: U=6.2 V
power factor: PF=1.00 (ideally sinusoidal voltage and current curve)

A theoretical efficiency is a function of the input voltage and a measure of the asymmetry in the average current distribution between the segments. The theoretical efficiency $\text{eff}_{th}$ is in this case calculated from the relationship between the LED voltage $U_i$ and all other voltage drops. Potential dynamic switching losses are in this case not taken into consideration for reasons of simplified illustration.

$$\text{eff}_{th} = \text{INT}(0 \ldots T)[U_{LED}(t)*I(t)]/\text{INT}(0 \ldots T)[U_{in}(t)*I(t)]$$

In this case, an electrical efficiency of more than 90% can be achieved virtually over the entire operating voltage range. The switching voltages of the individual electronic switches, which are each connected in parallel with one of the four LED segments, are set permanently, for example, and follow the secondary conditions (A) and (B), as a result of which optimized efficiency is provided.

Exemplary Optimization of the LED Efficiency

In addition, current modulation by virtue of the current preset I(t) in the current regulator and the switching rhythm in the case of actuation of the electronic switches can result in an undesired light modulation and in suboptimum efficiency of the LED operation.

The reduction in the LED efficiency is a consequence of the so-called droop effect. The increased current in the temporally limited switch-on phases of the LED segments results in a reduced efficiency in comparison with a continuous constant current operation with the same average current value. For the same efficiency as in the continuous constant current operation, a larger chip area would have to be used in order to reduce the current intensity in the LED chips. In other words, the chip area utilization during clocked operation is poorer than during constant current operation.

Figure 2:
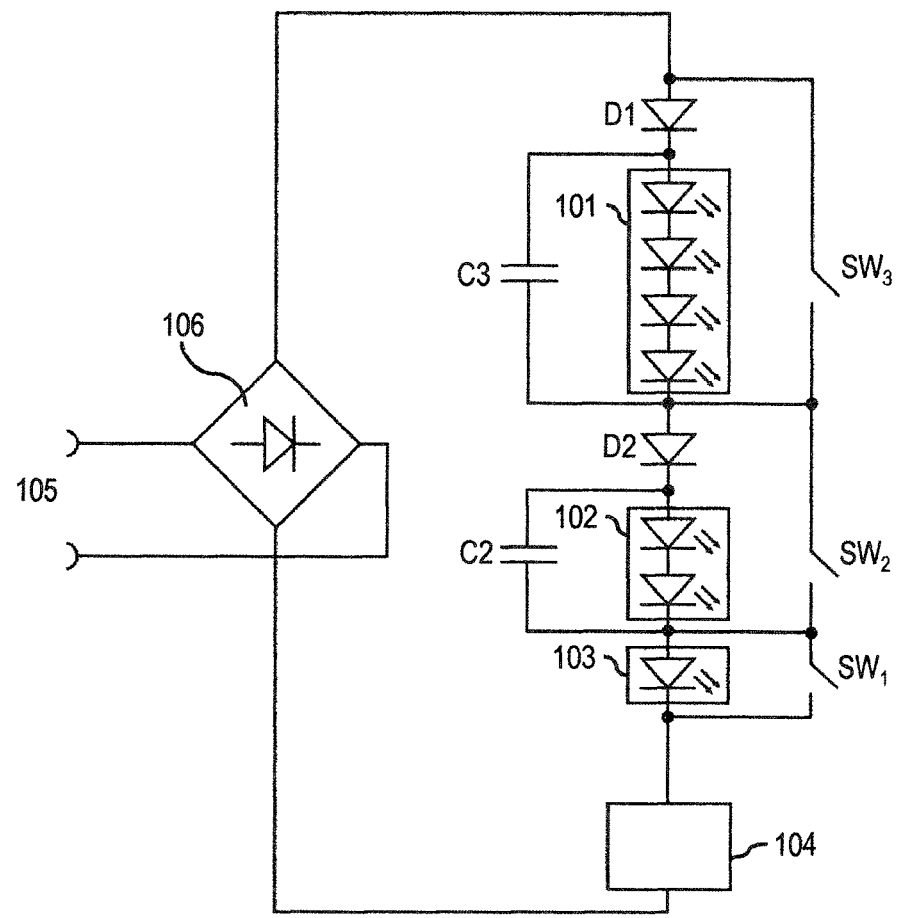
FIG. 2 shows a schematic circuit for actuating three LED segments, wherein the LED segments have different numbers of LEDs, wherein sometimes a decoupling diode is arranged between individual LEDs and a capacitor is arranged in parallel with a selection of the LED segments.

FIG. 2 shows a schematic circuit for actuating three LED segments, wherein the LED segments have different numbers of LEDs, wherein a decoupling diode is sometimes arranged between individual LEDs and a buffer capacitor is arranged in parallel with a selection of the LED segments.

The circuit illustrated in FIG. 2 relates, in parts, to the circuit shown in FIG. 1. In contrast to FIG. 1, the series circuit includes a diode D1, the LED segment 101, a diode D2, the LED segment 102, the LED segment 103 and the current regulator 104. The diodes D1 and D2 are decoupling diodes. The diodes D1 and D2 have the same polarization as the LEDs, i.e. all of the cathodes of the diodes point in the direction of the negative terminal.

The switch $SW_3$ is arranged in parallel with the series circuit including the diode D1 and the LED segment 101. The switch $SW_2$ is arranged in parallel with the series circuit including the diode D2 and the LED segment 102. The switch $SW_1$ is arranged in parallel with the LED segment 103.

In addition, in FIG. 2 a buffer capacitor C3 is arranged in parallel with the LED segment 101, and a buffer capacitor C2 is arranged in parallel with the LED segment 102.

The circuit shown in FIG. 2 avoids the above-described disadvantage of undesired light modulation. By means of the buffer capacitors C2 and C3 (which are embodied as electrolytic capacitors, for example), continuous operation of the LEDs is now possible. The current modulation is dependent on the capacitance of the capacitor and the steepness of the LED characteristic. The larger the buffer capacitor, the less modulation there is.

The decoupling diodes D1 and D2 between the LED segments prevent the discharge of the buffer capacitors C2 and C3 via the switches.

In order to prevent undesired flicker at twice the mains frequency, the LED segment with the highest forward voltage (the LED segment 101 in the example shown in FIG. 2) can be buffered, for example, by a buffer capacitor C3 connected in parallel and having correspondingly large dimensions.

The remaining LED segments can be operated, for example, at a higher frequency than twice the mains frequency and therefore hardly contribute to perceivable flicker, or do not contribute to this at all.

In this case, it is advantageous that the buffer capacitor (the capacitor C3 in the example shown in FIG. 2) only need be designed for a mains voltage which is lower than the maximum mains voltage. In FIG. 2, this reduced voltage is determined by the forward voltage $U_{f3}$ of the LEDs of the LED segment 101.

Preferably, all of the LED segments (in particular those LED segments with a forward voltage which is higher than a preset threshold value) can be buffered by parallel-connected buffer capacitors. If an LED segment includes few LEDs or only a single LED, however, the buffer capacitor can be dispensed with (see in this regard, by way of example, LED segment 103 in FIG. 2).

An advantageous embodiment consists in that only those LED segments which have the most series-connected LEDs or the highest forward voltages need to be provided with parallel-connected buffer capacitors ("to be buffered"). For example, only that LED segment with the highest forward voltage or else the two LED segments with the highest forward voltages can be buffered correspondingly.

The capacitance required for the buffer capacitors is approximately identical for all LED segments, for example, since the available voltage step decreases in the case of relatively short chains, but at the same time the frequency is higher in the case of the relatively short chains.

Using the example of the tabular representation shown above, it can be seen that, for in each case half the voltage and, associated therewith, half the voltage step $dU_m$, the frequency in the switching rhythm is doubled. The deenergized phases to be bypassed, of duration $dt_m$, are therefore only half as long. For the same setpoint current $I_{set,m}$ (symmetrical), for example, all the buffer capacitors $C_m$ are dimensioned equally. The voltage loads are in this case different:

$$Q = I_{set,m} * dt_m = C_m * dU_m \qquad (6).$$

Automatic Generation of the Switching Rhythm

The actuation of the electronic switches $SW_1$ to $SW_3$ illustrated by way of example in FIG. 1 and FIG. 2 can be performed by means of a control unit, for example a microcontroller. Owing to the variable ("floating") potentials, this can take place using a zero-potential (galvanically isolated) actuation. Such an embodiment is comparatively complex and therefore expensive, however.

Figure 3:
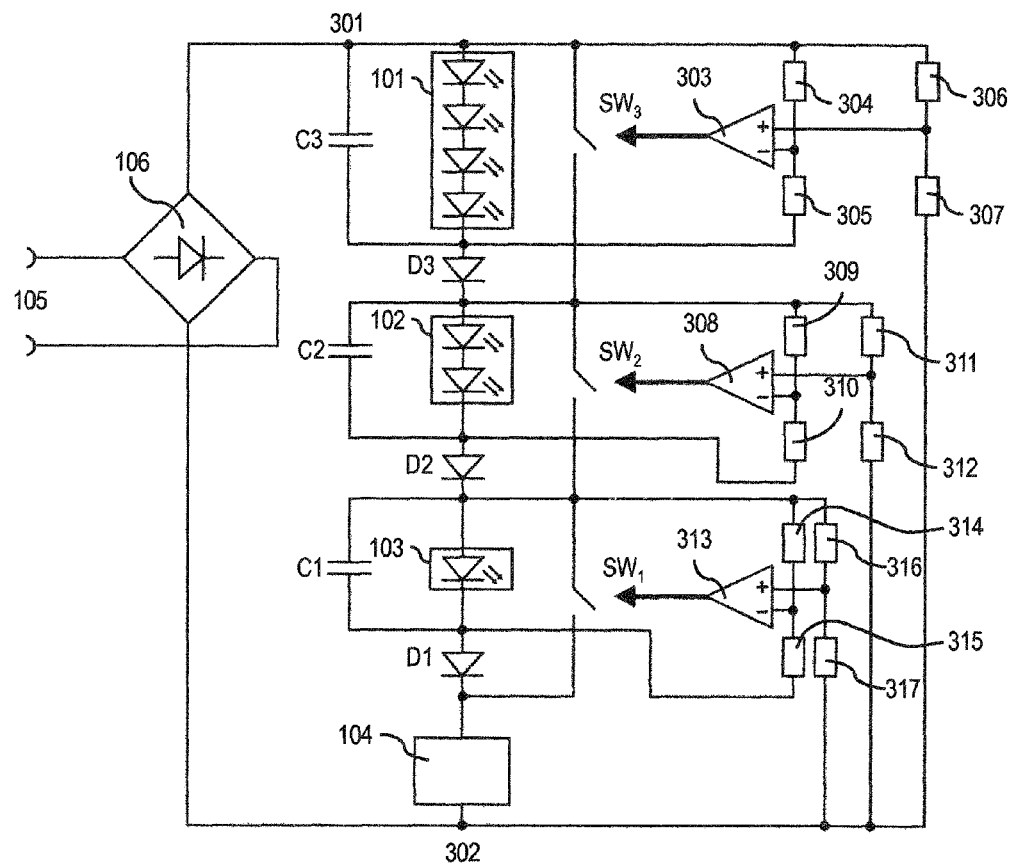
FIG. 3 shows a schematic circuit arrangement for actuating a plurality of electronic switches by means of comparators.

FIG. 3 shows a schematic circuit arrangement for actuating a plurality of electronic switches by means of comparators.

As already explained with reference to FIG. 1, the AC mains voltage 105 is rectified via a rectifier 106, and the rectified "pulsating" mains voltage is applied between two nodes 301 and 302.

A series circuit including the LED segment 101, a diode D3, the LED segment 102, the diode D2, the LED segment 103, the diode D1 and the current regulator 104 connects the nodes 301 and 302. The buffer capacitor C3 is arranged in parallel with the LED segment 101, the buffer capacitor C2 is arranged in parallel with the LED segment 102, and a buffer capacitor C1 is arranged in parallel with the LED segment 103.

The switch $SW_3$ is arranged in parallel with the series circuit including the LED segment 101 and the diode D3. The switch $SW_2$ is arranged in parallel with the series circuit including the LED segment 102 and the diode D2. The switch $SW_1$ is arranged in parallel with the series circuit including the LED segment 103 and the diode D1.

The switch $SW_3$ is actuated via the output of a comparator 303. A voltage divider including a series circuit including resistors 304 and 305 is arranged in parallel with the LED segment 101, wherein the center tap of this voltage divider is connected to the inverting input of the comparator 303. The nodes 301 and 302 are connected via a voltage divider including a series circuit including resistors 306 and 307, wherein the center tap of this voltage divider is connected to the noninverting input of the comparator 303.

The switch $SW_2$ is actuated via the output of a comparator 308. A voltage divider including a series circuit including resistors 309 and 310 is arranged in parallel with the LED segment 102, wherein the center tap of this voltage divider is connected to the inverting input of the comparator 308. The node above the LED segment 102 and the node 302 are connected via a voltage divider including a series circuit including resistors 311 and 312, wherein the center tap of this voltage divider is connected to the noninverting input of the comparator 308.

The switch $SW_1$ is actuated via the output of a comparator 313. A voltage divider including a series circuit including resistors 314 and 315 is arranged in parallel with the LED segment 103, wherein the center tap of this voltage divider is connected to the inverting input of the comparator 313. The node above the LED segment 103 and the node 302 are connected via a voltage divider including a series circuit including resistors 316 and 317, wherein the center tap of this voltage divider is connected to the noninverting input of the comparator 313.

The actuation of the electronic switches $SW_1$ to $SW_3$ is performed, as shown in FIG. 3, using the comparators 303, 308 and 313. Preferably, the actuation is performed in such a way that the switches $SW_1$ to $SW_3$ are opened when the voltage between the reference potential of the LED segments (in the example shown in FIG. 3 at the top end of the respective LED segment) and the node 302 is greater than the forward voltage of the respective LED segment.

The voltage difference between the reference potential of the LED segment m (at the upper end of the respective LED segment) and the node 302 will also be referred to below as the voltage difference (or control voltage) $US_m$ for the LED segment m.

This voltage difference $US_m$ also includes the voltage drop across all of the other LED segments between the LED segment m and the node 302. When the LED segment m is switched so as to be active, the voltages at the other LED segments $US_j$ are also influenced for all j<m, as a result of which these LED segments also switch virtually at the same time. This results in the desired switching rhythm.

The voltage of the LED segment m can be measured directly by the comparator when the chain has a buffer capacitor $C_m$. Otherwise, the voltage at the LED segment can be simulated via an analog reference voltage or via a sample-and-hold circuit.

Figure 5:
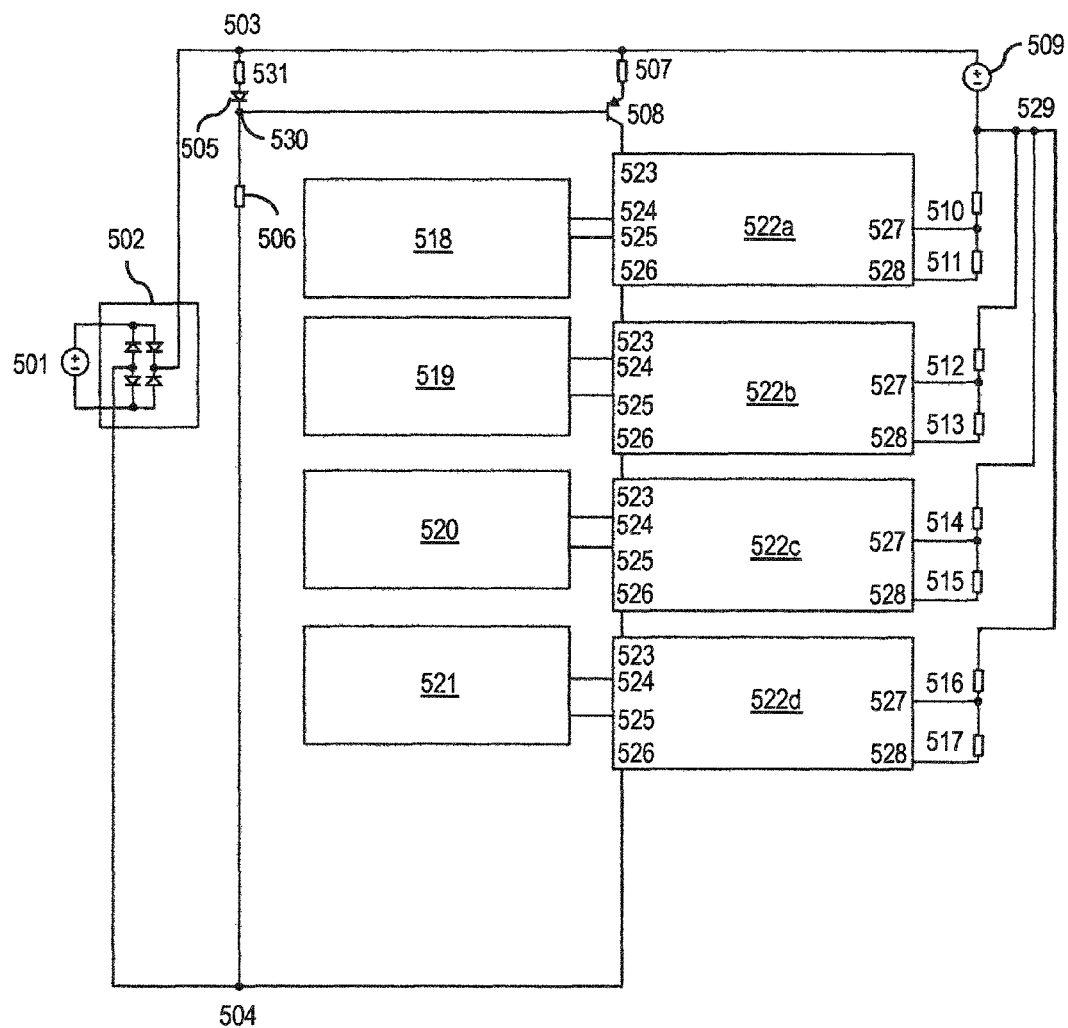
FIG. 5 shows, in order to illustrate features from the dependent claims, an alternative schematic circuit arrangement for actuating a plurality of electronic switches by means of discrete components.
Figure 6:
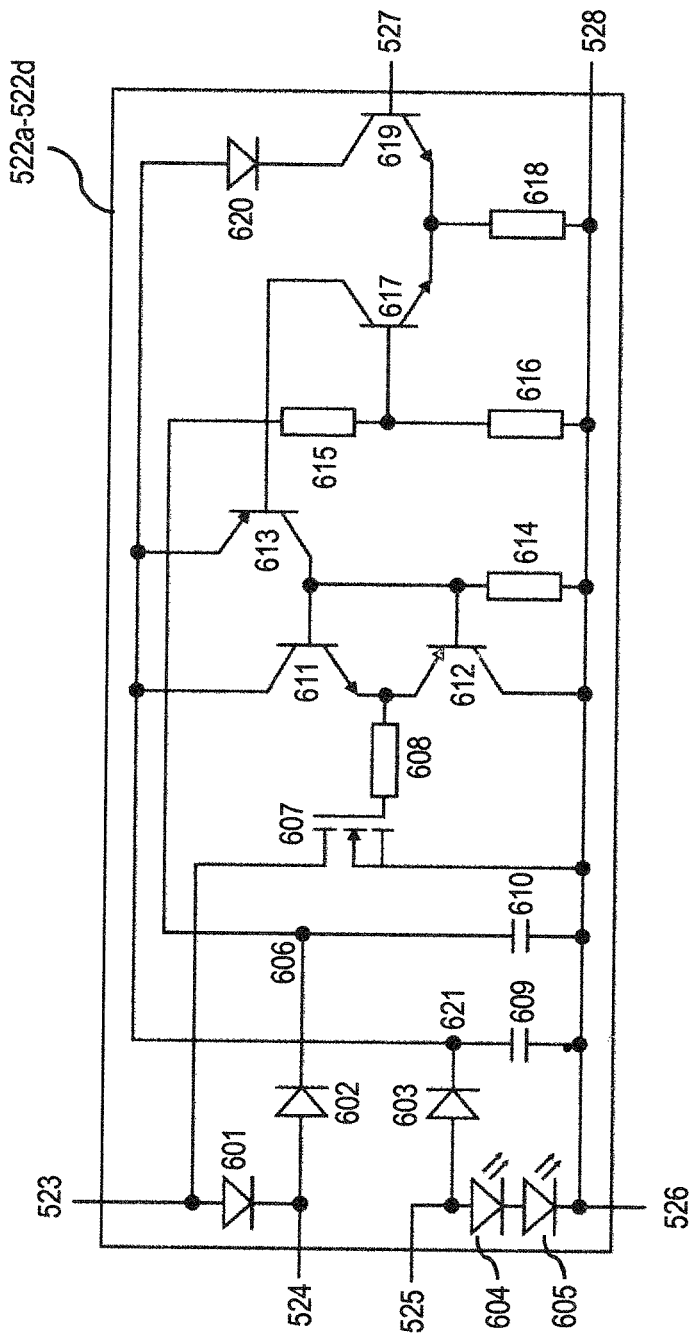
FIG. 6 shows a detailed illustration of the modules 522a to 522d shown in FIG. 5.

FIG. 5 and FIG. 6 show a circuit arrangement having such a sample-and-hold circuit and four LED segments. The above-explained comparators are realized in FIG. 5 and FIG. 6 by means of discrete components in an inexpensive manner.

An AC mains voltage 501 is connected to two nodes 503 and 504 via a rectifier 502. The node 503 is connected to a node 530 via a resistor 531 and a diode 505, wherein the cathode of the diode 505 points in the direction of the node 530. The node 530 is connected to the node 504 via a resistor 506. The node 530 is connected to the base of a pnp transistor 508, the emitter of the transistor 508 is connected to the node 503 via a resistor 507, and the collector of the transistor 508 is connected to a connection 523 of a module 522a.

FIG. 5 shows a plurality of modules 522a to 522d, which each have connections 523 to 528 and are each embodied comparably. An exemplary realization of the modules 522a to 522d is illustrated in FIG. 6.

A module 518 includes a series circuit of five LEDs, a module 519 includes a series circuit of 12 LEDs, a module 520 includes a series circuit of 24 LEDs, and a module 521 includes a series circuit of 54 LEDs. The connections 524 and 525 of the module 522a are connected to the module 518, the connections 524 and 525 of the module 522b are connected to the module 519, the connections 524 and 525 of the module 522c are connected to the module 520, and the connections 524 and 525 of the module 522d are connected to the module 521. The cathodes of the LEDs of the modules 518 to 521 are in this case oriented in the direction of the node 504.

The connection 526 of the module 522a is connected to the connection 523 of the module 522b, the connection 526 of the module 522b is connected to the connection 523 of the module 522c, and the connection 526 of the module 522c is connected to the connection 523 of the module 522d. The connection 526 of the module 522d is connected to the node 504.

The node 503 is connected to a node 529 via a voltage source 509 (optionally via four differently actuable voltage sources).

The node 529 is connected to the connection 527 of the module 522a via a resistor 510 and to the connection 528 of the module 522a via a series circuit including the resistor 510 and a resistor 511. The node 529 is connected to the connection 527 of the module 522b via a resistor 512 and to the connection 528 of the module 522b via a series circuit including the resistor 512 and a resistor 513. The node 529 is connected to the connection 527 of the module 522c via a resistor 514 and to the connection 528 of the module 522c via a series circuit including the resistor 514 and a resistor 515. The node 529 is connected to the connection 527 of the module 522d via a resistor 516 and to the connection 528 of the module 522d via a series circuit including the resistor 516 and a resistor 517.

FIG. 6 shows the internal design of the modules 522a to 522d and the connections 523 to 528 thereof.

The connection 523 is connected to the connection 524 via a diode 601, wherein the cathode of the diode 601 points in the direction of the connection 524. Furthermore, the connection 524 is connected to a node 606 via a diode 602, wherein the cathode of the diode 602 points in the direction of the node 606. The connection 523 is also connected to the drain connection of an n-channel MOSFET 607. The source connection of the MOSFET 607 is connected to the connection 526.

The node 606 is connected to the connection 526 via a capacitor 610. In addition the node 606 is connected to the base of an npn transistor 617 via a resistor 615. The base of the transistor 617 is connected to the connection 526 via a resistor 616.

The connection 525 is connected to a node 621 via a diode 603, wherein the cathode of the diode 603 points in the direction of the node 621. The node 621 is connected to the connection 526 via a capacitor 609. The connection 525 is connected to the connection 526 via a series circuit including two LEDs 604 and 605, wherein the cathodes of the LEDs 604 and 605 point in the direction of the connection 526.

The node 621 is connected to the collector of an npn transistor 611. The emitter of the transistor 611 is connected to the gate connection of the MOSFET 607 via a resistor 608. Furthermore, the emitter of the transistor 611 is connected to the emitter of a pnp transistor 612. The collector of the transistor 612 is connected to the connection 526.

The node 621 is connected to the emitter of a pnp transistor 613. The collector of the transistor 613 is connected to the base of the transistor 611, to the base of the transistor 612 and to the connection 526 via a resistor 614.

The node 621 is connected to the collector of an npn transistor 619 via a diode 620, wherein the cathode of the diode 620 points in the direction of the collector. The emitter of the transistor 619 is connected to the emitter of the transistor 617 and to the connection 526 via a resistor 618. The collector of the transistor 617 is connected to the base of the transistor 613. The base of the transistor 619 is connected to the connection 527, and the connection 526 is connected to the connection 528.

By way of example, the circuit illustrated in FIG. 5 and FIG. 6 has the following component parts and/or dimensions (resistors in ohms, capacitors in farads): R_531=3, 3 k; R_506=200 k, R_507=100; R_510=27 k; R_512=47 k; R_514=100 k; R_516=200 k; R_511=R_513=R_515=R_517=3.3 k; R_608=10; R_614=22 k; R_616=3.3 k; R_618=22 k; C_609=C_610=1μ. The resistor 615 has different values depending on the module 522a to 522d, for example in the module 522a: 27 k; in the module 522b 47 k; in module 522c: 100 k; and in module 522d 200 k.

In order to meet the above-explained secondary condition (A), it may be advantageous to slightly reduce the voltage difference $US_m$ as comparison value with respect to the respective LED chain voltage $U_i$. Thus, parasitic voltage drops Up across the decoupling diodes 601 and across the current regulator 508 can be compensated for. This reduction in the voltage differences $US_m$ can be achieved by one or more voltage sources $UO_m$.

The voltage source 509 can control, for example, a minimum voltage drop across the current regulator 104. For this purpose, the voltage source 509 is designed, for example, in such a way that the current regulator 104 can operate properly (i.e. without current interruptions) in any operating case.

Furthermore, the average voltage drop across the current regulator 104 should preferably be as low as possible for the optimization of losses.

Secondary Condition (C) and Balancing

Figure 4:
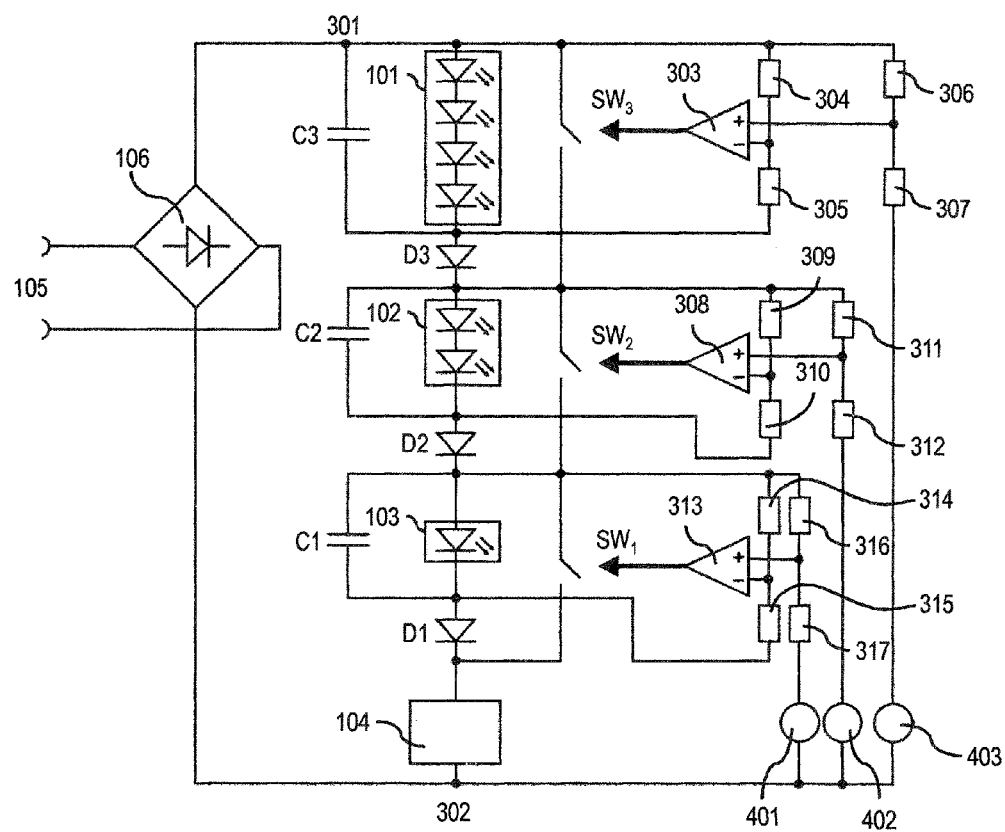
FIG. 4 shows, on the basis of the illustration shown in FIG. 3, a plurality of voltage sources for balancing the currents between individual LED segments.

FIG. 4 shows, on the basis of the illustration in FIG. 3, a plurality of voltage sources for balancing the currents between the individual LED segments.

In contrast to FIG. 3, in FIG. 4 the resistors 317, 312 and 307 are not connected directly to the node 302. Instead, the resistor 317 is connected to the node 302 via a voltage source 401, the resistor 312 is connected to the node 302 via a voltage source 402, and the resistor 307 is connected to the node 302 via a voltage source 403.

The voltage sources 401 to 403 are actuated depending on an average value for the input voltage. Such an average value is related in particular to the average (rectified) mains voltage. The voltage sources 401 to 403 are therefore actuated taking into consideration the secondary condition (C) and effect controlled switching delay for the LED segment m.

The voltage sources 401 to 403 can be used to control the current through the current regulator 104; for example, the current regulator 104 can be embodied as a resistor, wherein the current through this resistor is adjustable by means of the voltage sources 401 to 403.

Similarly to the numerical solution of the nonlinear optimization problem for the secondary condition (C) for the case of the time-controlled circuit arrangement in accordance with the above embodiments, the optimum values for the voltage sources $UO_i(U_{in})$ can also be determined as a function of the rms input voltage $U_{in,rms}$.

This can be achieved, for example, by numerical optimization, wherein an error function $E_{rr}$ is expressed as a function of the voltages across the voltage source $UO_m$ instead of the times $t_i$.

Therefore, the asymmetry can be detected, for example, by the error function $E_{rr}$. The error function $E_{rr}$ is determined, for example, depending on the voltages $UO_m(U_{in})$. The voltages $UO_m(U_{in})$ can be adapted for all input voltages $U_{in}$ in the context of an optimization in such a way that the error function becomes minimal.

As an alternative or in addition, the error function $E_{rr}$ can be expressed as a function of the length of the semiconductor light-emitting elements (for example the number of the (respective) semiconductor light-emitting elements) and/or as a function of the voltage sources. In the context of the numerical optimization, a favorable design can accordingly be determined taking into consideration, for example, the following degrees of freedom: number of semiconductor light-emitting elements, number of segments, setting of the voltage sources (per segment), current waveform (harmonics).

For example, in an arrangement with M LED segments, M freely selectable parameters $UO_m(U_{in})$ can be available for optimization of the secondary condition (C).

Additional Exemplary Implementations

Figure 7:
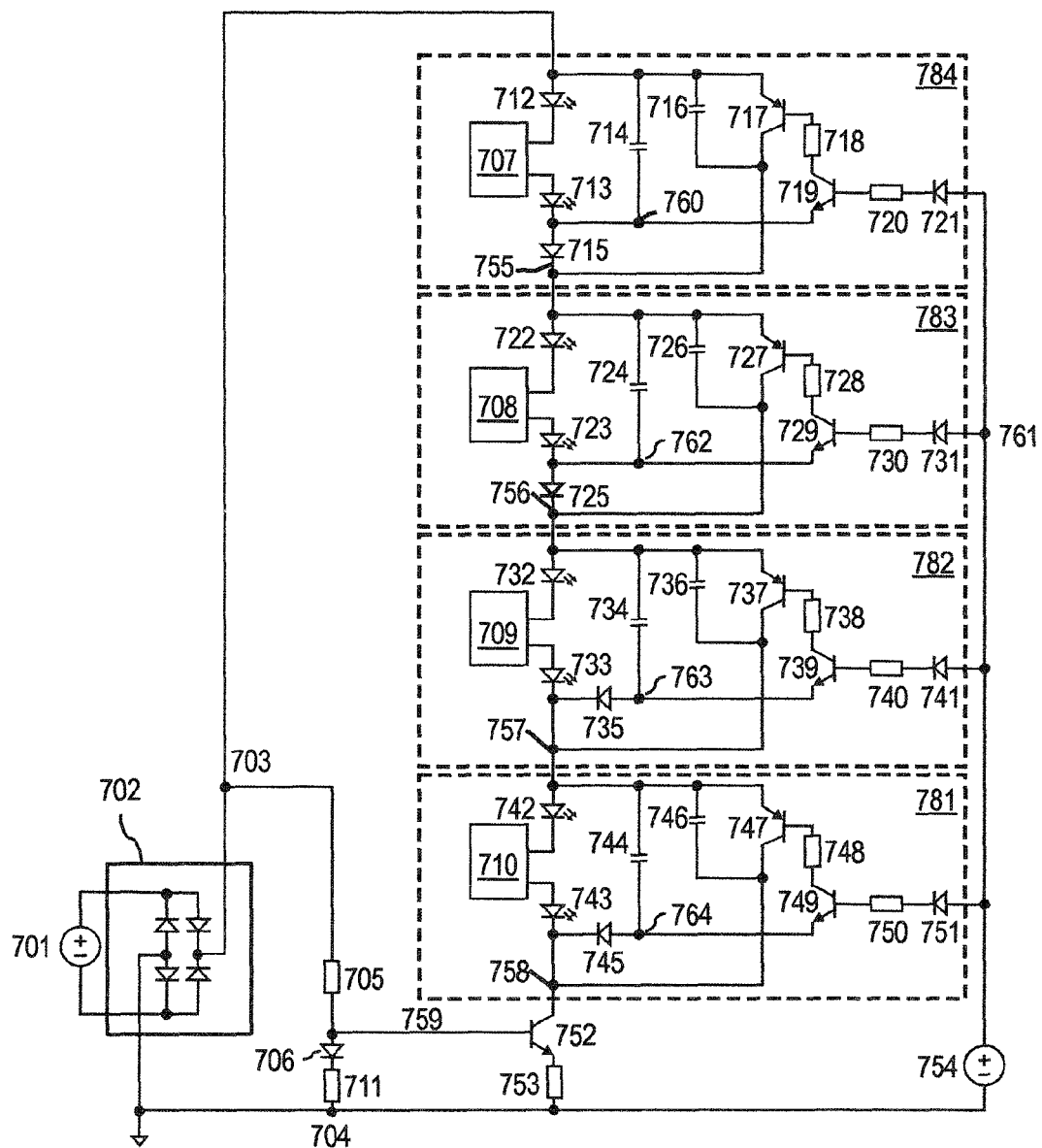
FIG. 7 shows an alternative circuit arrangement to FIG. 5.

FIG. 7 shows an alternative circuit arrangement to that shown in FIG. 5. An AC mains voltage 701 is connected to two nodes 703 and 704 via a rectifier 702. The node 703 is connected to a node 759 via a resistor 705. The node 759 is connected to the node 704 via a diode 706 and a resistor 711, wherein the cathode of the diode 706 points in the direction of the node 704. The node 759 is connected to the base of an npn transistor 752. The emitter of the transistor 752 is connected to the node 704 via a resistor 753.

The node 703 is connected to a node 760 via a series circuit including an LED 712, a module 707 and an LED 713. The module 707 includes a series circuit including a plurality of LEDs, for example 54 LEDs. The node 703 is connected to the node 760 via a buffer capacitor 714. The node 703 is connected to a node 755 via a capacitor 716. The node 760 is connected to the node 755 via a diode 715, wherein the cathode of the diode 715 points in the direction of the node 755. The node 703 is connected to the emitter of a pnp transistor 717. The collector of the transistor 717 is connected to the node 755. The base of the transistor 717 is connected to the collector of an npn transistor 719 via a resistor 718. The emitter of the transistor 719 is connected to the node 760. The base of the transistor 719 is connected to a node 761 via a series circuit including a resistor 720 and a diode 721, wherein the cathode of the diode 721 points in the direction of the base of the transistor 719.

The node 755 is connected to a node 762 via a series circuit including an LED 722, a module 708 and an LED 723. The module 708 includes 24 series-connected LEDs. The node 755 is connected to a node 762 via a buffer capacitor 724. The node 762 is connected to the node 756 via a decoupling diode 725, wherein the cathode of the diode 725 points in the direction of the node 756. The node 755 is connected to the node 756 via a capacitor 726. The node 755 is connected to the emitter of a pnp transistor 727. The collector of the transistor 727 is connected to the node 756. The base of the transistor 727 is connected to the collector of an npn transistor 729 via a resistor 728. The emitter of the transistor 729 is connected to the node 762. The base of the transistor 729 is connected to the node 761 via a series circuit including a resistor 730 and a diode 731, wherein the cathode of the diode 731 points in the direction of the base of the transistor 729.

The node 756 is connected to a node 757 via a series circuit including an LED 732, a module 709 and an LED 733. In this case, the module 709 includes a series circuit including 12 LEDs. The node 756 is connected to a node 763 via a capacitor 734. The node 756 is connected to the node 757 via a capacitor 736. The node 756 is connected to the emitter of a pnp transistor 737. The collector of the transistor 737 is connected to the node 757. The base of the transistor 737 is connected to the collector of an npn transistor 739 via a resistor 738. The emitter of the transistor 739 is connected to the node 763. The node 763 is connected to the node 757 by a diode 735, wherein the cathode of the diode 735 points in the direction of the node 757. The base of the transistor 739 is connected to the node 761 via a series circuit including a resistor 740 and a diode 741, wherein the cathode of the diode 741 points in the direction of the base of the transistor 739.

The node 757 is connected to a node 758 via a series circuit including an LED 742, a module 710 and an LED 743. The module 710 includes a series circuit including five LEDs. The node 757 is connected to a node 764 via a capacitor 744. The node 764 is connected to the node 758 via a diode 745, wherein the cathode of the diode 745 points in the direction of the node 758. In addition, the node 758 is connected to the collector of the transistor 752. The node 757 is connected to the node 758 via a capacitor 746. The node 757 is connected to the emitter of a pnp transistor 747. The collector of the transistor 747 is connected to the node 758. The base of the transistor 747 is connected to the collector of an npn transistor 749 via a resistor 748. The emitter of the transistor 749 is connected to the node 764. The base of the transistor 749 is connected to the node 761 via a series circuit including a resistor 750 and a diode 751, wherein the cathode of the diode 751 points in the direction of the base of the transistor 749.

The node 761 is connected to the node 704 via a voltage source 754.

In respect of FIG. 7, the observation is made that the cathodes of the LEDs are each oriented in the direction of the node 704.

By way of example, the circuit illustrated in FIG. 7 has the following component parts and/or dimensions (resistors in ohms, capacitors in farads): R_705=200 k; R_711=3.3 k; R_753=100; R_720=R_730=R_740=R_750=220 k; R_718=220 k; R_728=110 k; R_738=56 k; R_748=27 k; C_716=C_726+C_736=C_746=1 p; C_714-47 μ; C_724=C_734=C_744=1 μ.

The buffer capacitor 714 is comparatively large and acts as buffer capacitor for the LEDs of the modules 707 and the LEDs 712 and 713. In this case, it is advantageous that the buffer capacitor 714 only needs to be designed for the voltage drop across these LEDs and not for the total level of the mains voltage. Correspondingly, the buffer capacitor 714 can be embodied to be smaller and therefore more space-saving. One option consists in that the buffer capacitor 714 is an electrolytic capacitor; in particular the buffer capacitor 714 can be the only electrolytic capacitor in the circuit shown in FIG. 7. The buffer capacitor 714 can be embodied separately from the compact rest of the circuit via corresponding lines. In particular, it is possible to provide the buffer capacitor 714 as a replaceable (for example plugable) component part. It is thus possible to ensure that, in the event of failure of the electrolytic capacitor 714, said electrolytic capacitor can be replaced easily and quickly, and therefore the circuit is functional again after a short period of time.

The capacitors 716, 726, 736 and 746 do not represent parasitic capacitances, which can also be dispensed with in a real circuit, if appropriate, because such low capacitances result owing to the circuit design itself.

The diodes 721, 731, 741 and 751 are also optional and can be dispensed with, if appropriate, if the transistors 719, 729, 739 and 749 are designed or can be designed so as to have corresponding dielectric strength.

By virtue of the dimensions provided for the circuit shown in FIG. 7, it is possible to achieve a situation in which the transistor 717 is operated at a switching frequency of approximately 100 Hz; flicker which may be perceived owing to this switching frequency under certain circumstances is prevented by the buffer capacitor 714.

The transistor 727 operates at a switching frequency of approximately 200 Hz, the transistor 737 operates at a switching frequency of approximately 400 Hz, and the transistor 747 operates at a switching frequency of approximately 800 Hz.

The combination of the buffer capacitor 714 and the diode 715 represents a peak value detector (peak detector) for the LED segment including the module 707 and the LEDs 712 and 713. Correspondingly, the buffer capacitor 724 and the decoupling diode 725 represent a peak value detector for the LED segment including the module 708 and the LEDs 722 and 723, the capacitor 734 and the diode 735 represent a peak value detector for the LED segment including the module 709 and the LEDs 732 and 733, and the capacitor 744 and the diode 745 represent a peak value detector for the LED segment including the module 710 and the LEDs 742 and 743.

The transistors 719, 729, 739 and 749 act as comparators. The mode of operation will be described by way of example below using the first stage for the LED segment including the module 710 and the LEDs 742 and 743.

For a further, simpler illustration, the LED segment including the module 710 and the LEDs 742 and 743 with the corresponding actuation 744 to 751 will be denoted below as first stage 781. The LED segment including the module 709 and the LEDs 732 and 733 with the corresponding actuation 734 to 741 will be referred to as second stage 782. The LED segment including the module 708 and the LEDs 722 and 723 with the corresponding actuation 724 to 731 will be referred to as third stage 783.

The LED segment including the module 707 and the LEDs 712 and 713 with the corresponding actuation 714 to 721 is referred to as fourth stage 784.

The resistor 750 is designed, in combination with the capacitor 744, in such a way that the capacitor 744 is not completely discharged even during the longest switch-on phase of the transistor 747 to be expected. The voltage source 754 presets a voltage offset as minimum voltage, for example of the order of 6 V, which should not be undershot in the case of the transistor 752. The transistor 749 compares the voltage of 6 V from the voltage source 754 with the voltage across the node 764. As soon as the voltage across the node 764 becomes lower than the voltage from the voltage source 754, the transistor 749 is turned on. As soon as the transistor 749 is turned on, the transistor 747 also turns on. If the transistor 747 is turned on, the module 710 and the LEDs 742 and 743 are bypassed ("short-circuited"). This also shifts the working points of the remaining actuation units for the other LEDs.

In this case, it is noted that the series-connected LEDs represent one LED segment per stage. Each LED segment is actuated via a separate driver, which, in the example in FIG. 7, in particular has the two transistors and the described peak value detector. The actuation of the drivers takes place depending on the instantaneous value of the rectified mains voltage between the nodes 703 and 704 by the threshold voltage provided by the voltage source 754.

In FIG. 7, the voltage source 754 is used as common voltage source for the plurality of actuating units of the LED segments. Optionally, it is also possible for a plurality of voltage sources to be provided, for example a voltage source for each actuation unit of the LED segment.

Figure 8:
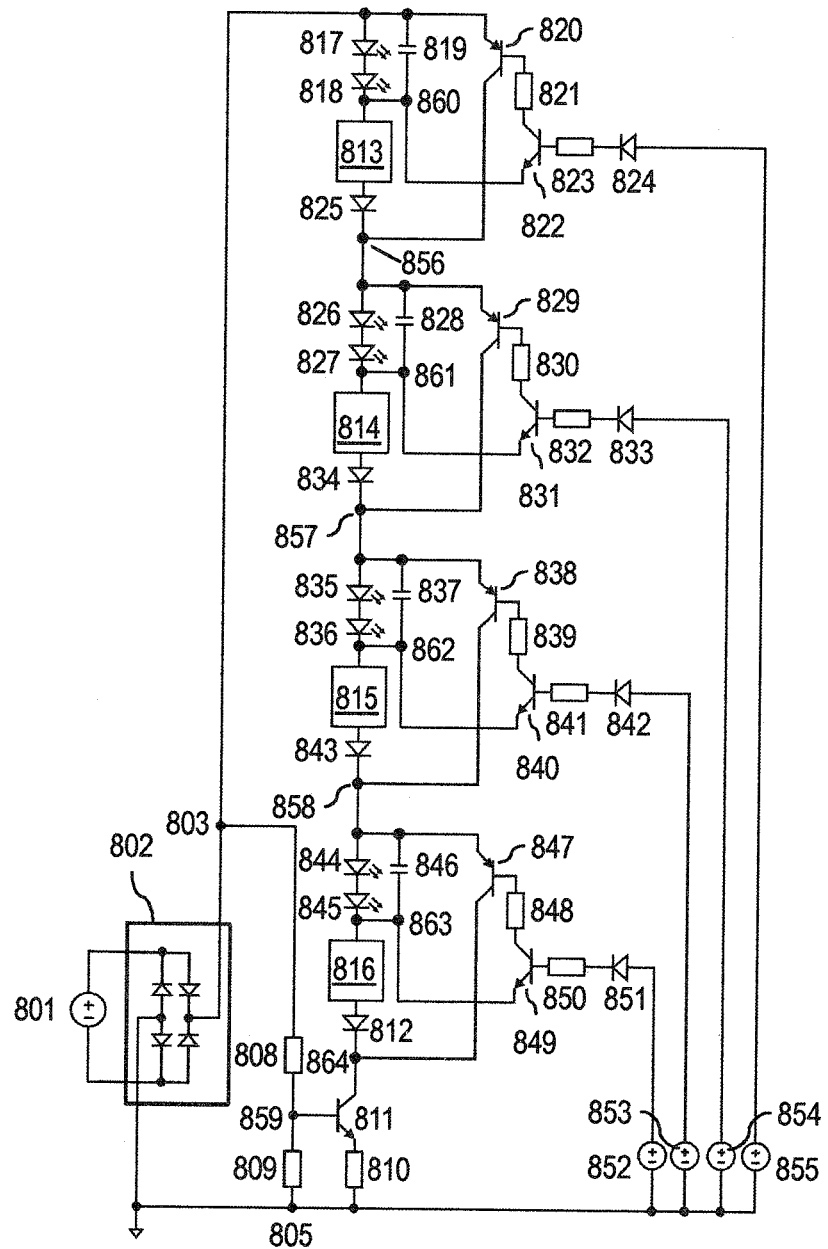
FIG. 8 shows an alternative circuit arrangement which is substantially based on the circuit shown in FIG. 7 and provides a plurality of voltage sources, which can be used for actuating or balancing the individual LED segments.

FIG. 8 shows an alternative circuit arrangement, which is based substantially on the circuit shown in FIG. 7 and provides a plurality of voltage sources, which can be used for actuating the individual LED segments.

An AC mains voltage 801 is connected to two nodes 803 and 805 via a rectifier 802. The node 803 is connected to a node 859 via a resistor 808. The node 859 is connected to the node 805 via a resistor 809. The node 859 is connected to the base of an npn transistor 811. The emitter of the transistor 811 is connected to the node 805 via a resistor 810. The node 803 is connected to a node 860 via a series circuit including an LED 817 and an LED 818. The node 860 is connected to a node 856 via a series circuit including a module 813 and a diode 825, wherein the cathode of the diode 825 points in the direction of the node 856. The node 803 is connected to the node 860 via a capacitor 819. The node 803 is connected to the emitter of a pnp transistor 820. The collector of the transistor 820 is connected to the node 856. The base of the transistor 820 is connected to the collector of an npn transistor 822 via a resistor 821. The emitter of the transistor 822 is connected to the node 860. The base of the transistor 822 is connected to the node 805 via a series circuit including a resistor 823 and a diode 824 and a voltage source 855, wherein the cathode of the diode 824 points in the direction of the base of the transistor 822.

The node 856 is connected to a node 861 via a series circuit including an LED 826 and an LED 827. The node 861 is connected to a node 857 via a series circuit including a module 814 and a diode 834, wherein the cathode of the diode 834 points in the direction of the node 857. The node 856 is connected to the node 861 via a capacitor 828. The node 856 is connected to the emitter of an pnp transistor 829. The collector of the transistor 829 is connected to the node 857. The base of the transistor 829 is connected to the collector of an npn transistor 831 via a resistor 830. The emitter of the transistor 831 is connected to the node 861. The base of the transistor 831 is connected to the node 805 via a series circuit including a resistor 832, a diode 833 and a voltage source 854, wherein the cathode of the diode 833 points in the direction of the base of the transistor 831.

The node 857 is connected to a node 862 via a series circuit including an LED 835 and an LED 836. The node 862 is connected to a node 858 via a module 815, which is connected in series with a diode 843, wherein the cathode of the diode 843 points in the direction of the node 858. The node 857 is connected to the node 862 via a capacitor 837. The node 857 is connected to the emitter of a pnp transistor 838. The collector of the transistor 838 is connected to the node 858. The base of the transistor 838 is connected to the collector of an npn transistor 840 via a resistor 839. The emitter of the transistor 840 is connected to the node 862. The base of the transistor 840 is connected to the node 805 via a series circuit including a resistor 841, a diode 842 and a voltage source 853, wherein the cathode of the diode 842 points in the direction of the base of the transistor 840.

In this case, it should be noted that the number of diodes 817, 818 which are arranged in parallel with the capacitor 819 (correspondingly in the other segments) is only two, by way of example. Other (for example also different) numbers of diodes per segment are also possible.

The node 858 is connected to a node 863 via a series circuit including an LED 844 and an LED 845. The node 863 is connected to a node 864 via a module 816, which is connected in series with a diode 812, wherein the cathode of the diode 812 points in the direction of the node 864. The node 858 is connected to the node 863 via a capacitor 846. The node 858 is connected to the emitter of pnp transistor 847. The collector of the transistor 847 is connected to the node 864. The base of the transistor 847 is connected to the collector of an npn transistor 849 via a resistor 848. The emitter of the transistor 849 is connected to the node 863. The base of the transistor 849 is connected to the node 805 via a series circuit including a resistor 850, a diode 851 and a voltage source 852, wherein the cathode of the diode 851 points in the direction of the base of the transistor 849.

The node 864 is connected to the collector of the transistor 811.

The modules 813, 814, 815 and 816 each have a series circuit of LEDs. The series circuits of LEDs are in particular embodied differently per module, with the result that there are different voltage drops across each of the modules 813 to 816. For example, the modules 813 to 816 can be embodied in such a way that the following voltage drops result:

across the module 813: 150 V,
across the module 814: 70 V,
across the module 815: 30 V, and
across the module 816: 10 V.

In respect of FIG. 8, it should be noted that the cathodes of the LEDs are each oriented in the direction of the node 805.

By way of example, the circuit illustrated in FIG. 8 has the following component parts and/or dimensions (resistors in ohms, capacitors in farads): R_808=200 k; R_809=3.3 k; R_810=100; R_821=R_830=R_839=R_848=10 k; R_823=R_832=R_841=R_850=1 M; C_819=C_828=C_837=C_846=1μ.

The present operating circuit for LEDs has high efficiency and can be produced at low cost. Advantageously, it is possible to distribute the electric power uniformly or with a high degree of uniformity among the LED segments. Optionally, the power distribution can be controlled along the LED chain. The proposed solution furthermore enables a power factor close to 1.0 and therefore small or easily controllable harmonics. The circuit is centrally dimmable, for example via an adjustable linear regulator. A further advantage is the small installation space required since no magnetic components (inductors or the like) are required. This also results in good electromagnetic compatibility.

The way in which the circuit according to the disclosure functions will be described below using a three-stage circuit, which is similar to the circuit shown in FIG. 7. In accordance with FIG. 10A, therefore, three stages 781, 782, 783 are arranged in a series circuit. The "lowermost" stage 781 is arranged closest to a reference point 704 of the circuit, i.e. it has the lowest electric potential difference with respect to the reference point.

The next stage 782 in the series circuit is arranged so to speak "above" the lowermost stage 781 and has a high electrical potential in comparison with the stage 781, and therefore a greater potential difference with respect to the reference point 704. The adjacently arranged stages therefore differ primarily in terms of the potential, wherein the stages which, by definition, are "further towards the bottom" have a lower potential with respect to the reference point than the stages which, by definition, are "further towards the top".

The stage 781 which is arranged closest to the reference point 704 in the circuit (i.e. the lowermost stage), has the smallest forward voltage of the circuit. In one embodiment, the next stage 782, which has a greater potential difference with respect to the reference point (i.e. the stage which is further towards the top), has a greater forward voltage. This continues for the following stages in this embodiment. In a further embodiment, the forward voltages of successive stages are doubled in each case starting from the lowermost stage, which has the lowest electrical potential difference with respect to the reference point.

In one embodiment, all of the summation voltages which can be formed from partial quantities of the forward voltages of the segments are different. In this case, a partial quantity of the forward voltages can be considered to be any sum of the forward voltages of at least two segments which do not, however, need to be arranged directly adjacent in the series circuit. The total sum of all the segments is not a partial quantity, and represents the highest possible summation voltage. The summation voltages should in this case not correspond to a forward voltage of a segment.

Figure 9A:
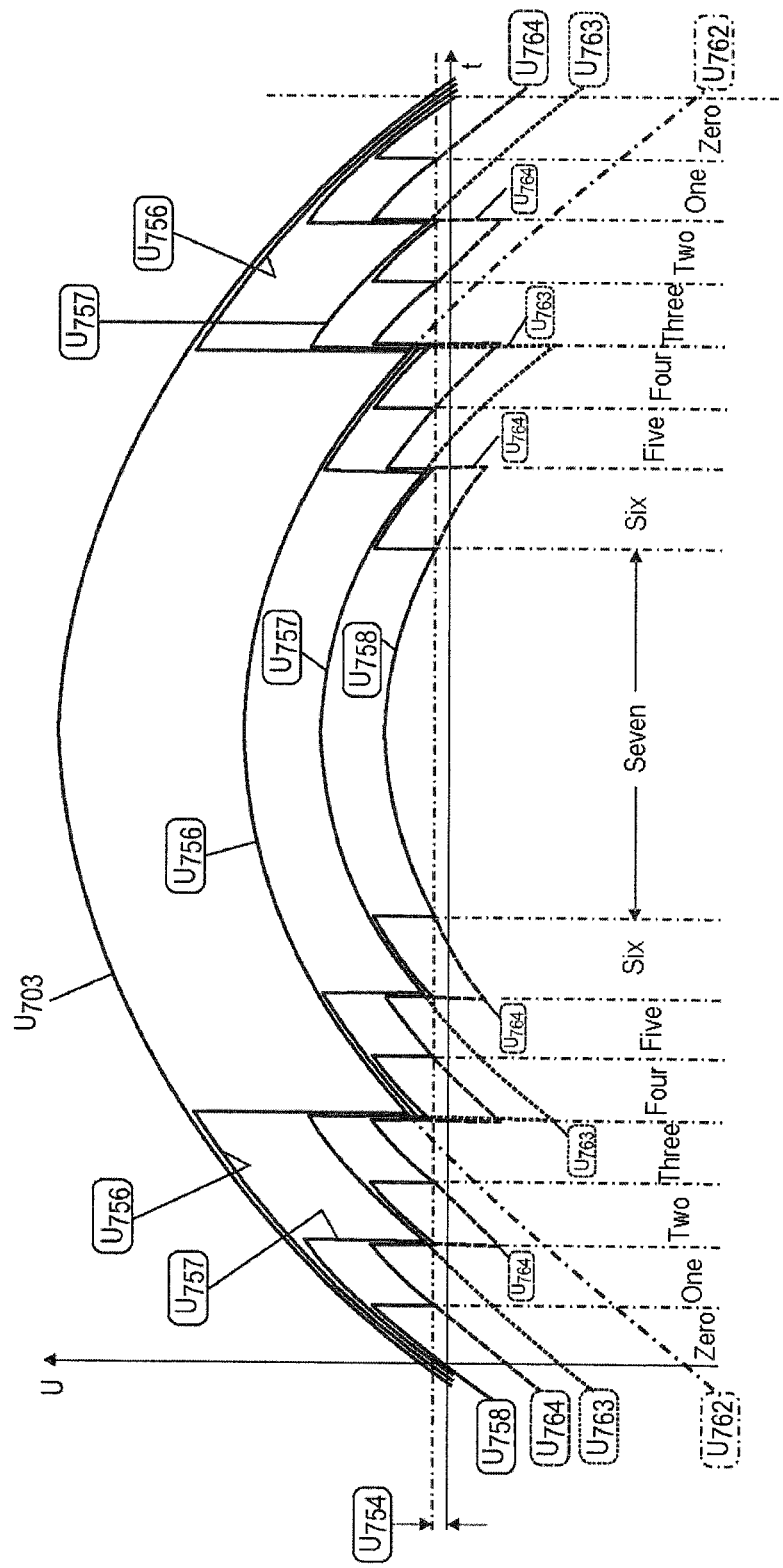
FIG. 9A shows the individual voltage characteristics, in each case two per LED segment, below the rectified mains voltage over time.
Figure 10A:
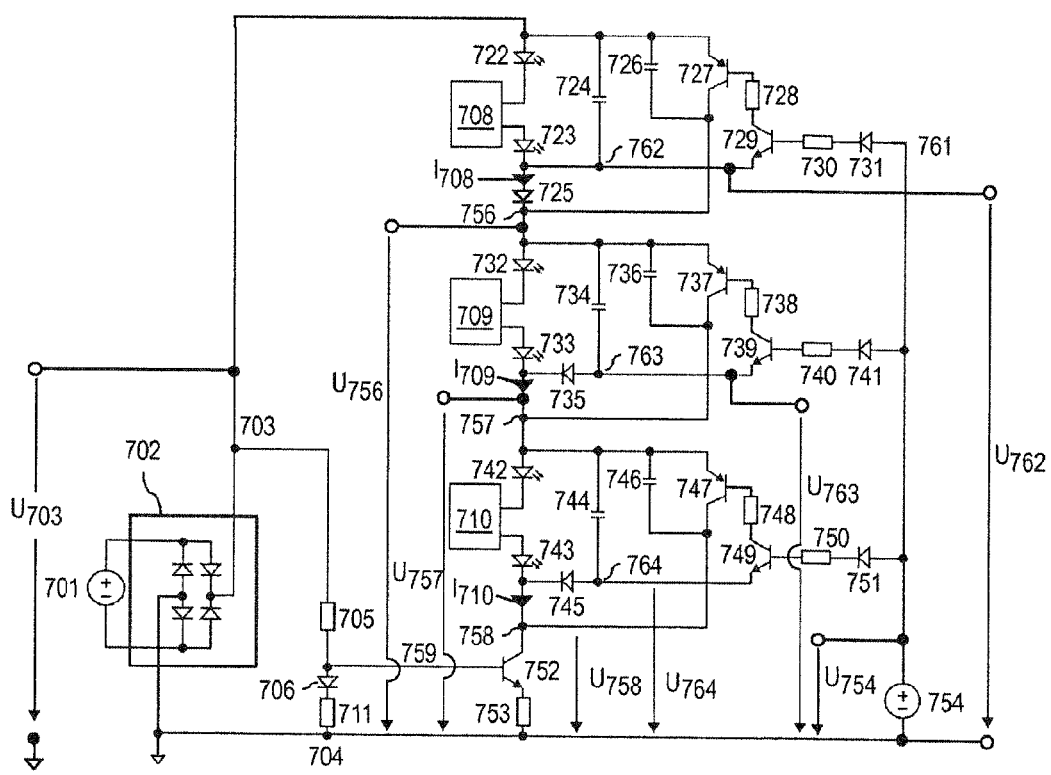
FIG. 10A shows an alternative circuit arrangement to FIG. 7 with the phasors for the voltages from FIG. 9A and currents from FIG. 9B and with the current characteristics which are different per phase.

FIG. 9A shows a mains half wave as a rectified mains voltage $U_{703}$ with further voltages, which are present across the corresponding nodes in FIG. 7 or FIG. 10A. The rectified mains voltage is present across the node 703. $I_{703}$ is the current through the LEDs owing to the driving rectified mains voltage $U_{703}$, i.e. is substantially the mains current. All of the voltages are measured with respect to the node 704, which is therefore the reference point of the circuit.

The voltage $U_{758}$ in FIG. 9A or FIG. 10A corresponds to the voltage across the node 758. The voltage $U_{764}$ in FIG. 9A or FIG. 10A corresponds to the voltage across the node 764, which is at the same time the base point of the first stage.

The voltage $U_{757}$ in FIG. 9A or FIG. 10A corresponds to the voltage across the node 757. The voltage $U_{763}$ in FIG. 9A or FIG. 10A corresponds to the voltage across the node 763, which is at the same time the base point of the second stage. The voltage $U_{756}$ in FIG. 9A or FIG. 10A corresponds to the voltage across the node 756. The voltage $U_{762}$ in FIG. 9A or FIG. 10A corresponds to the voltage across the node 762, which is at the same time the base point of the third stage. The voltage $U_{754}$ corresponds to the voltage from the voltage source 754, and is in this case the threshold voltage, on the basis of which switching takes place. The mode of operation of the circuit will now be described in individual phases from zero to seven, with the current flows thereof being illustrated in FIGS. 10B to 10I. The number of phases results from the number of stages in the circuit. In the case of three stages, the circuit operates with a maximum of $2^3=8$ phases. In the case of N stages, the circuit therefore operates with a maximum of $2^N$ phases.

The individual phases zero to seven are plotted over time t in FIG. 9A below the time characteristic of the rectified mains voltage $U_{703}$.

Figure 9B:
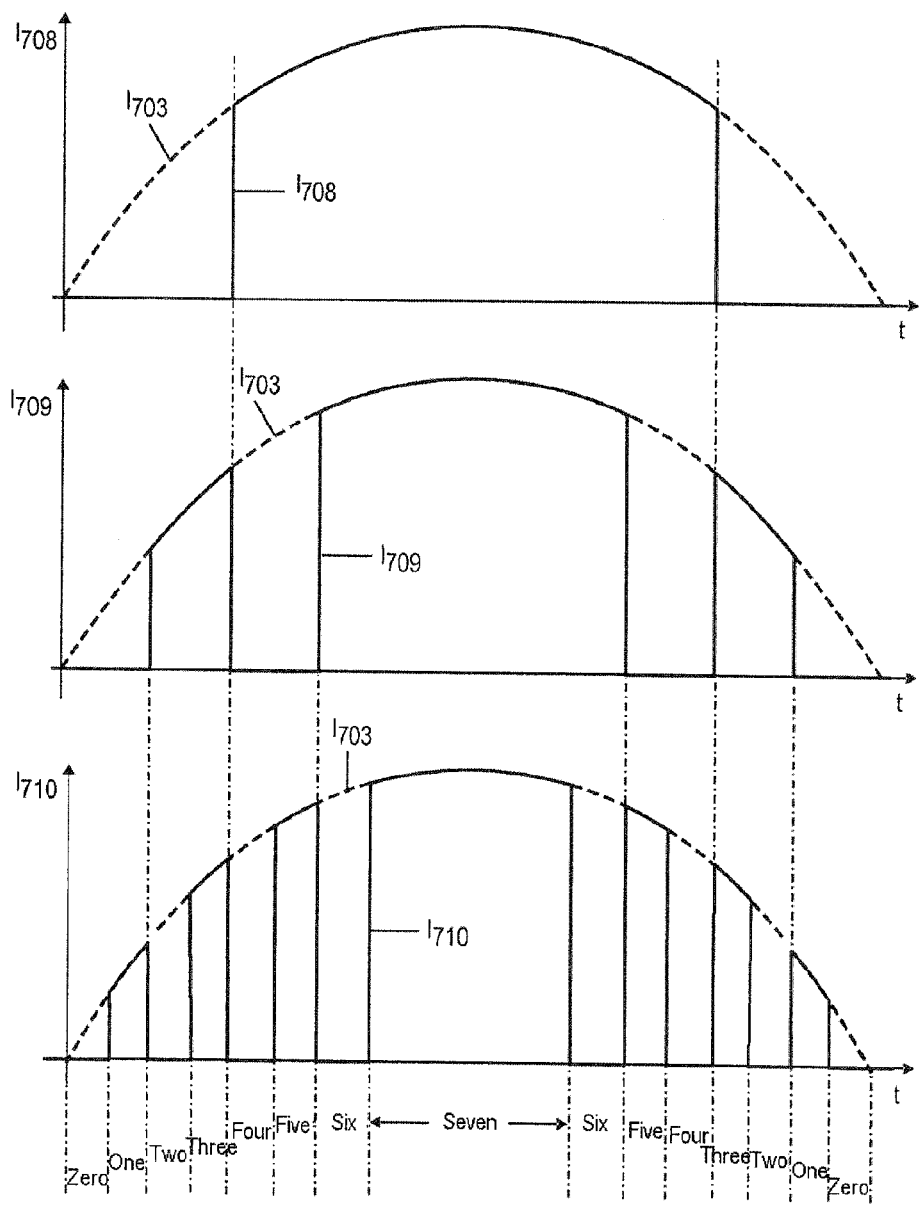
FIG. 9B shows the current characteristics over time for the LED segments.

FIG. 9B illustrates the currents $I_{708}$, $I_{709}$, $I_{710}$ through the individual LED segments of the stages 783, 782, 781. It can clearly be seen that the total current $I_{703}$ is distributed among the individual LED segments in accordance with the phases, i.e. quasi-"chopped". When viewed in combination, i.e. the envelope of these currents, the sinusoidal total current illustrated by dashed lines then results, with the exception of the phase zero, in which no LED segment emits light, and a current through the transistor 752 is generated in order to achieve correspondingly good power factor correction. Owing to the sinusoidal characteristic of the current $I_{703}$ following the mains voltage, a very good power factor results for the circuit.

Figure 10B:
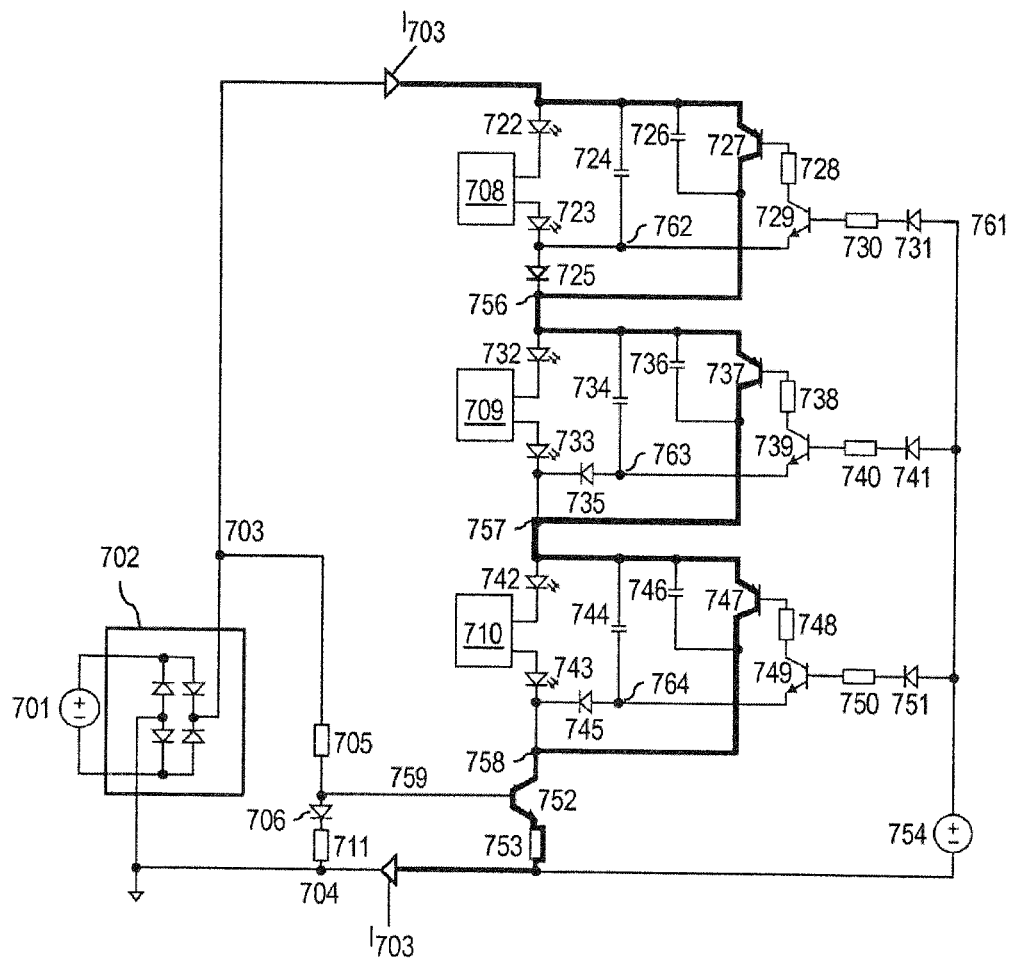
FIG. 10B shows the current characteristic of the circuit shown in FIG. 10A in phase 0.

The current characteristic in the phase zero is illustrated in FIG. 10B. The condition for phase zero is that all of the base-point voltages $U_{764}$, $U_{763}$, $U_{762}$ of the individual stages are less than the threshold voltage $U_{754}$. The circuit should be dimensioned in such a way that the threshold voltage $U_{754}$ is lower than the forward voltage of the series-connected LEDs in the first stage. In phase zero, all of the driver transistors 747, 737, 727 are on, and therefore all of the LEDs are bypassed, and none of the LEDs is supplied directly from the mains current $I_{703}$. This follows from the low instantaneous voltage of the rectified mains voltage $U_{703}$. Phase zero always occurs in the direct vicinity of the mains voltage zero crossing. Although none of the existing LEDs is supplied by the mains current $I_{703}$ in this phase, owing to the ever active current regulator, nevertheless a low mains current proportional to the mains voltage flows. For better understanding, the mode of operation of the actuating circuit of the various stages will be described below. The electronic short-circuiting switch or driver transistors 747, 737, 727 are switched on and off by the electronic comparison switches or comparison transistors 749, 739, 729. The comparison transistors are supplied the necessary voltage by the capacitors 744, 734, 724. Owing to the fact that all of the driver transistors are on, the base-point voltages $U_{764}$, $U_{763}$ and $U_{762}$ of the individual stages 781, 782, 783 are lower than the threshold voltage $U_{754}$. The threshold voltage $U_{754}$ is applied to the bases of the comparison transistors 749, 739, 729 via diodes 751, 741, 731, which operate as measuring diodes, and base resistors 750, 740, 730. Therefore, all of the comparison transistors are on, and also switch the driver transistors 747, 737, 727 on via the collector resistors 748, 738, 728.

Figure 10C:
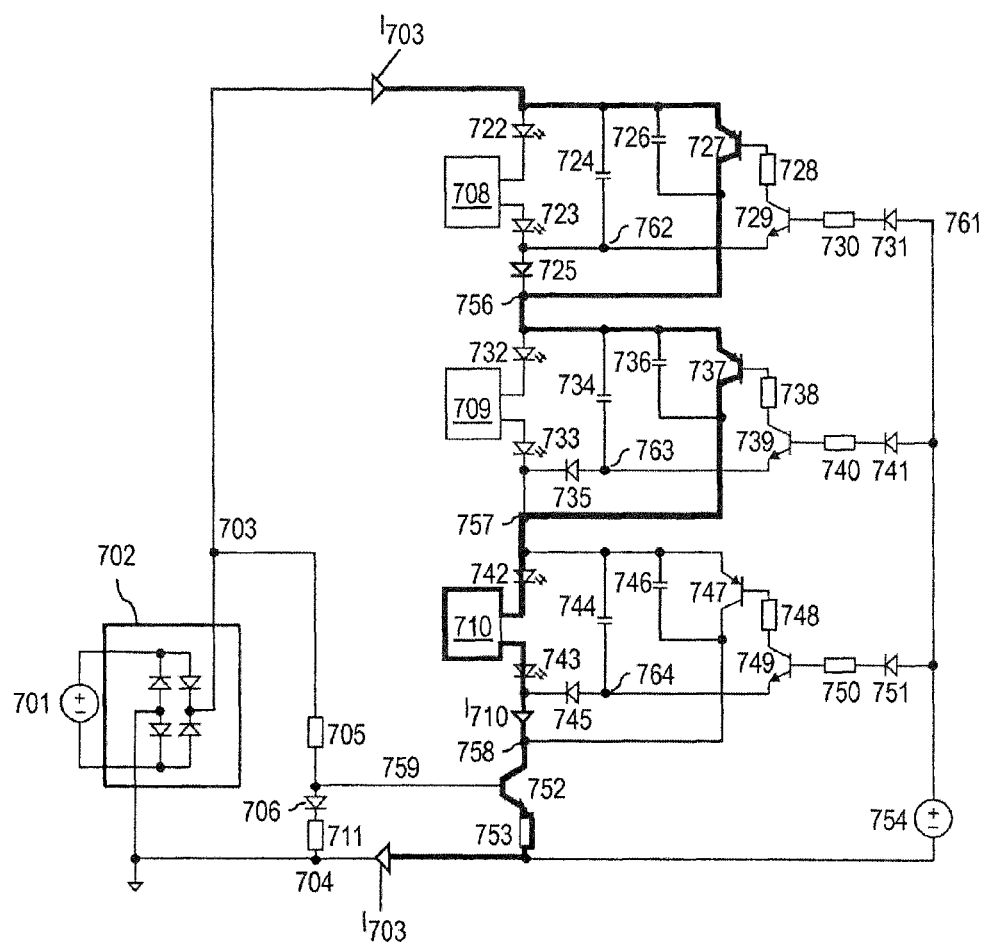
FIG. 10C shows the current characteristic of the circuit shown in FIG. 10A in phase one.

The current characteristic in phase one is illustrated in FIG. 10C. The condition for phase one is that the base-point voltage $U_{764}$ of the first stage 781 is greater than the threshold voltage $U_{754}$, and that the remaining base-point voltages $U_{763}$ and $U_{762}$ of the other stages are lower than the threshold voltage $U_{754}$. In phase one, the driver transistors 737, 727 are on, and therefore the LEDs in the second stage 782 and the third stage 783 are bypassed, and none of these LEDs is supplied directly by the current $I_{703}$. Owing to the fact that the comparison transistor 749 in the first stage 781 has been disconnected owing to the above condition during the transition from phase zero to phase one, the driver transistor 747 also attains a high resistance value and allows the current $I_{703}$ of the rectified mains voltage $U_{703}$ to flow through the LEDs in the first stage. This attainment of a high resistance value is also referred to below as safety isolation of the segment assigned to the respective driver transistor. At the same time, the capacitor 744 is recharged to the present forward voltage of the LEDs in the first stage 781 via a diode 745, which operates as decoupling diode, and the diode 751 turns off. Owing to the higher forward voltage of the second stage 782 and the third stage 783, the associated base-point voltages $U_{763}$ and $U_{762}$ are still lower than the threshold voltage $U_{704}$, for which reason the associated comparison transistors 739 and 729 continue to remain conductive, uninfluenced by the switching action of the first stage, and therefore also the associated driver transistors 737, 727 can be switched on. The switching action of the first stage, in particular of the sudden voltage change between phases zero and one of the voltage $U_{758}$ down to approximately the value of the threshold voltage $U_{754}$, is picked up by the transistor 752, which operates as current-regulating transistor in the linear operating mode.

Figure 10D:
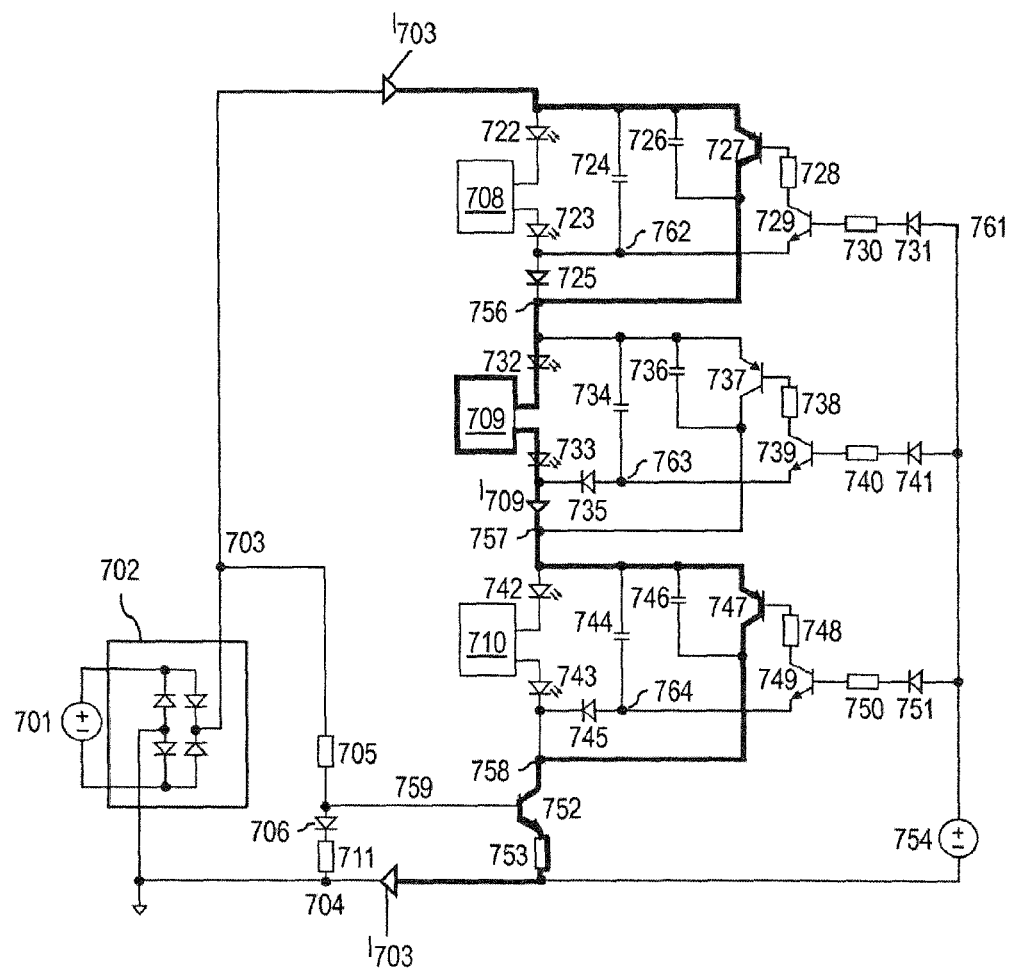
FIG. 10D shows the current characteristic of the circuit shown in FIG. 10A in phase two.
Figure 10E:
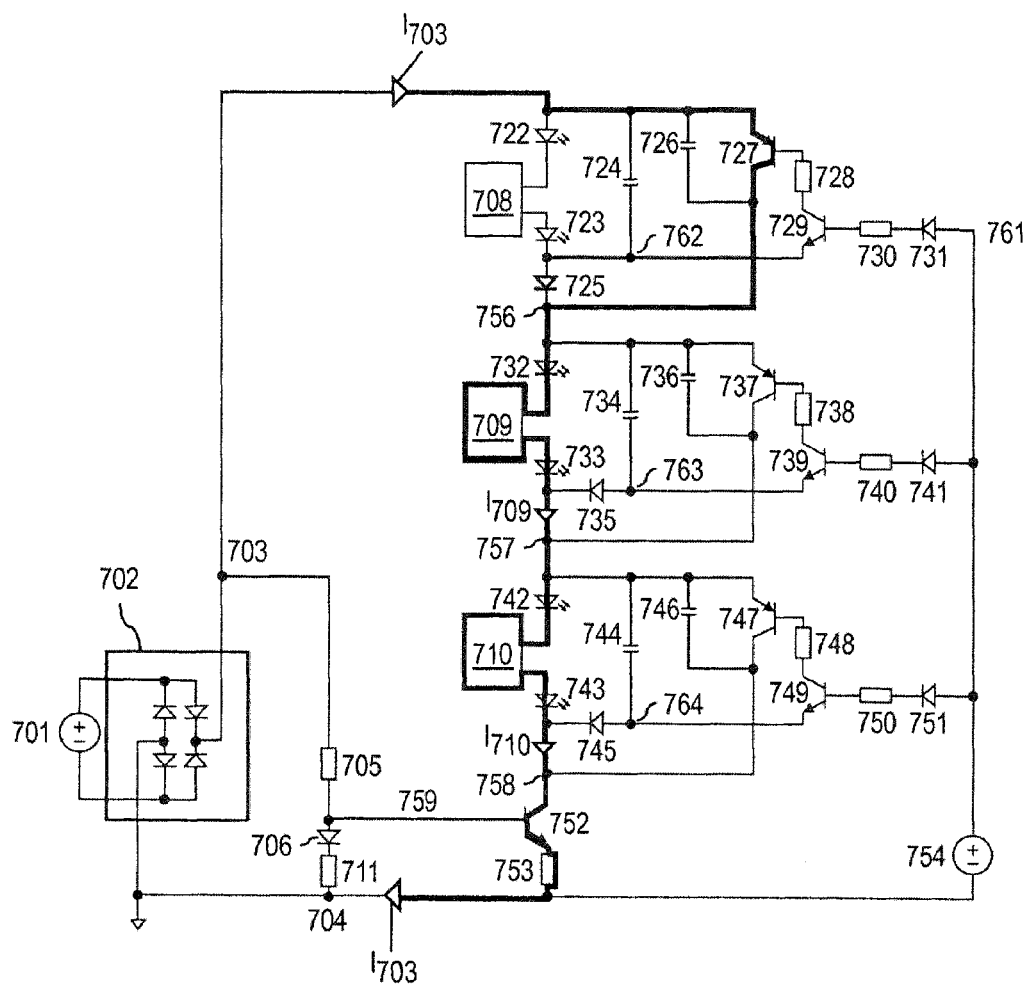
FIG. 10E shows the current characteristic of the circuit shown in FIG. 10A in phase three.

The current characteristic in phase two is illustrated in FIG. 10D. The condition for phase two is that the base-point voltage $U_{763}$ of the second stage 782 is greater than the threshold voltage $U_{754}$, and that the remaining base-point voltages $U_{764}$ and $U_{762}$ of the other stages are lower than the threshold voltage $U_{754}$. In phase two, the driver transistors 747, 727 are on, and therefore the LEDs in the first stage 781 and the third stage 783 are bypassed, and none of these LEDs is supplied directly by the current $I_{703}$. Phase one makes a transition to phase two when the base-point voltage $U_{763}$ of the second stage 782 becomes greater than the threshold voltage $U_{754}$. As a result, the diode 741 and the comparison transistor 739 turn off, for which reason the driver transistor 737 also attains a high resistance and allows the current $I_{703}$ to supply the LEDs in the second stage. At the same time, the capacitor 734 is recharged to the present forward voltage of the LEDs in the second stage 782 via a diode 735, which operates as decoupling diode. Owing to the driver transistor 737 being turned off, the base-point voltage $U_{764}$ of the first stage 781 jumps to below the threshold voltage $U_{754}$, as a result of which the comparison transistor 749 in the first stage 781 switches on again. Therefore, the associated driver transistor 747 is also turned on and takes over the current $I_{703}$. Owing to the relatively high forward voltage of the third stage 783 in comparison with the second stage 782, the associated base-point voltage $U_{762}$ is still lower than the threshold voltage $U_{704}$, for which reason the associated comparison transistor 729 continues to remain conductive, uninfluenced by the switching action of the first and second stages, and therefore allows the associated driver transistor 727 to be switched on. The switching actions of the first and second stages, in particular the sudden change in voltage between phase one and phase two in the voltage $U_{758}$ down to approximately the value of the threshold voltage $U_{754}$, are picked up by the transistor 752, which operates as current-regulating transistor in the linear operating mode. The switching action of the second stage effects the opposite switching action of the first stage with the lower forward voltage of the associated LEDs, which is between the reference point 704 and the second stage. The current characteristic in phase three is illustrated in FIG. 10E. The condition for phase three is that the base-point voltage $U_{764}$ of the first stage 781 and the base-point voltage $U_{763}$ of the second stage 782 are greater than the threshold voltage $U_{754}$, and that ultimately now only the base-point voltage $U_{762}$ of the third stage is lower than the threshold voltage $U_{754}$. In phase three, only the driver transistor 727 is on, and therefore the LEDs in the third stage 783 are bypassed, and none of these LEDs is supplied directly by the current $I_{703}$. Phase two makes a transition to phase three when the base-point voltage $U_{764}$ of the first stage 781 becomes higher than the threshold voltage $U_{754}$. By virtue of the driver transistor 747 turning off, as effected thereby, the voltage $U_{758}$ jumps to approximately the value of the threshold voltage $U_{754}$, which jump in the voltage $U_{758}$ is picked up by the transistor 752. At the same time, the capacitor 744 is again recharged to the present forward voltage of the LEDs in the first stage 781 via a diode 745, which operates as decoupling diode.

Figure 10F:
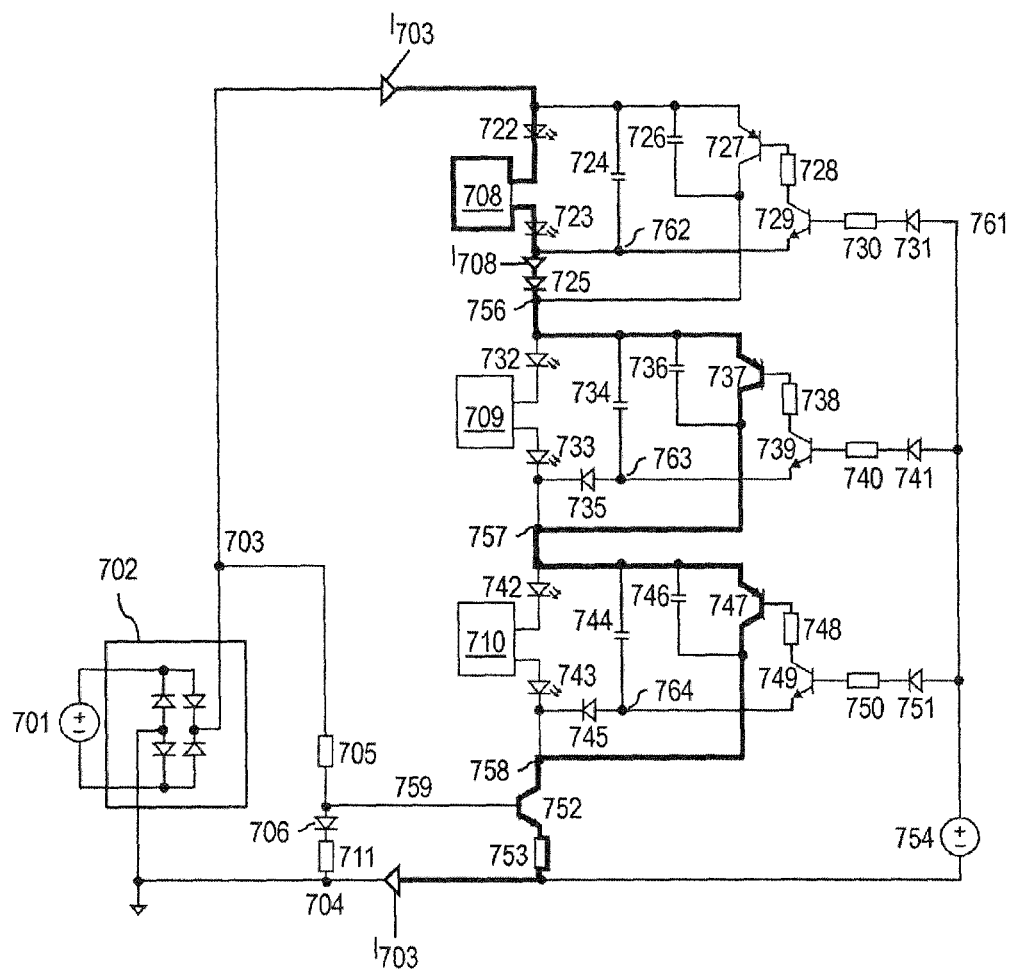
FIG. 10F shows the current characteristic of the circuit shown in FIG. 10A in phase four.
Figure 10G:
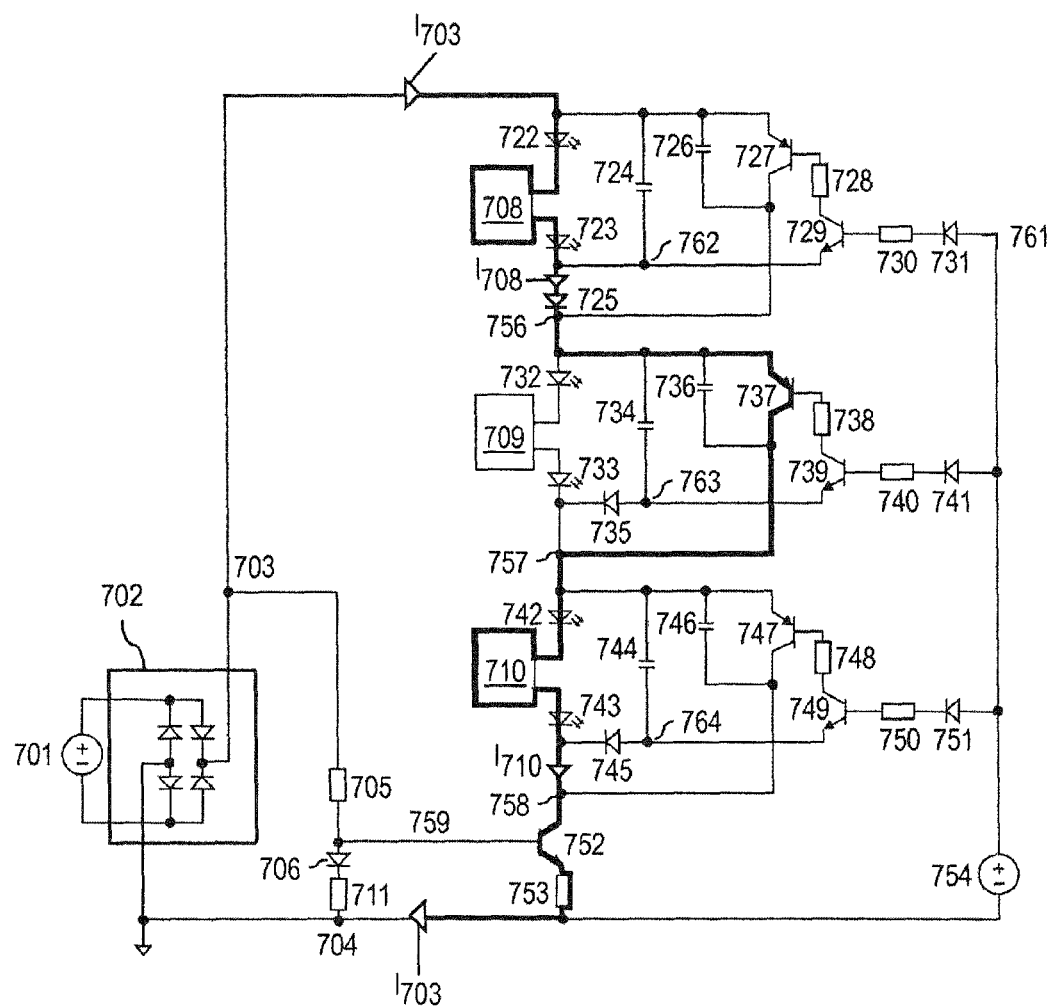
FIG. 10G shows the current characteristic of the circuit shown in FIG. 10A in phase five.

The current characteristic in phase four is illustrated in FIG. 10F. The condition for phase four is that, ultimately, the base-point voltage $U_{762}$ of the third stage 783 with the highest forward voltage of the LEDs is also greater than the threshold voltage $U_{754}$, and that the remaining base-point voltages $U_{764}$ and $U_{763}$ of the other stages are lower than the threshold voltage $U_{754}$. In phase four, the driver transistors 747, 737 are on, and therefore the LEDs in the first stage 781 and the second stage 782 are bypassed, and none of these LEDs is supplied directly by the current $I_{703}$. Phase three makes the transition to phase four when the base-point voltage $U_{762}$ of the third stage 783 becomes greater than the threshold voltage $U_{754}$. As a result, the diode 731 and the comparison transistor 729 turn off, for which reason the driver transistor 727 also attains a high resistance and allows the current $I_{703}$ to supply the LEDs in the third stage. At the same time, the buffer capacitor 724 is recharged to the present forward voltage of the LEDs in the third stage 783 via a decoupling diode 725. By virtue of the driver transistor 727 turning off, the base-point voltages $U_{764}$ of the first stage 781 and $U_{763}$ of the second stage 782 jump to below the threshold voltage $U_{754}$, as a result of which the comparison transistors 749 and 739 in both stages switch on again. Therefore, the associated driver transistors 747 and 737 are also turned on again and take over the current $I_{703}$. The switching actions for all three stages, in particular the sudden change in voltage between phases three and four of the voltage $U_{758}$, are picked up by the transistor 752. The switching action of the third stage effects an opposite switching action of the first and second stages, in the direction of the reference point 704, with in each case lower forward voltages of the associated LEDs.

The current characteristic in phase five is illustrated in FIG. 10F. The condition for phase five is that the base-point voltage $U_{764}$ of the first stage 781 and the base-point voltage $U_{762}$ of the third stage 783 are higher than the threshold voltage $U_{754}$, and that only the base-point voltage $U_{763}$ of the second stage is lower than the threshold voltage $U_{754}$. In phase five, only the driver transistor 737 is on, and therefore the LEDs in the second stage 782 are bypassed, and none of these LEDs is supplied directly by the current $I_{703}$. Phase four makes the transition to phase five when the base-point voltage $U_{764}$ of the first stage 781 becomes greater than the threshold voltage $U_{754}$. By virtue of the driver transistors 747 turning off, as effected thereby, the voltage $U_{758}$ jumps down to approximately the value of the threshold voltage $U_{754}$, which sudden change in the voltage $U_{758}$ is picked up by the transistor 752. At the same time, the capacitor 744 is again recharged to the present forward voltage of the LEDs in the first stage 781 via a diode 745, which operates as decoupling diode.

Figure 10H:
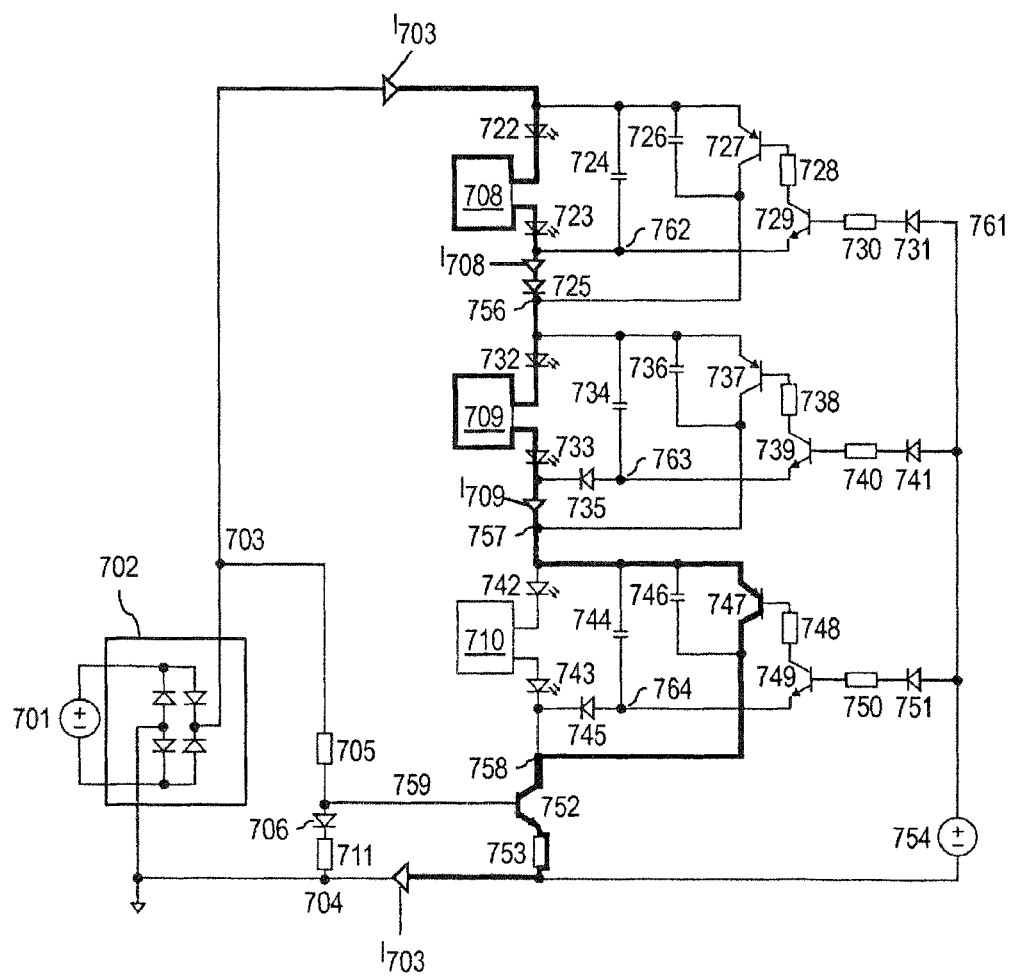
FIG. 10H shows the current characteristic of the circuit shown in FIG. 10A in phase six.
Figure 10:
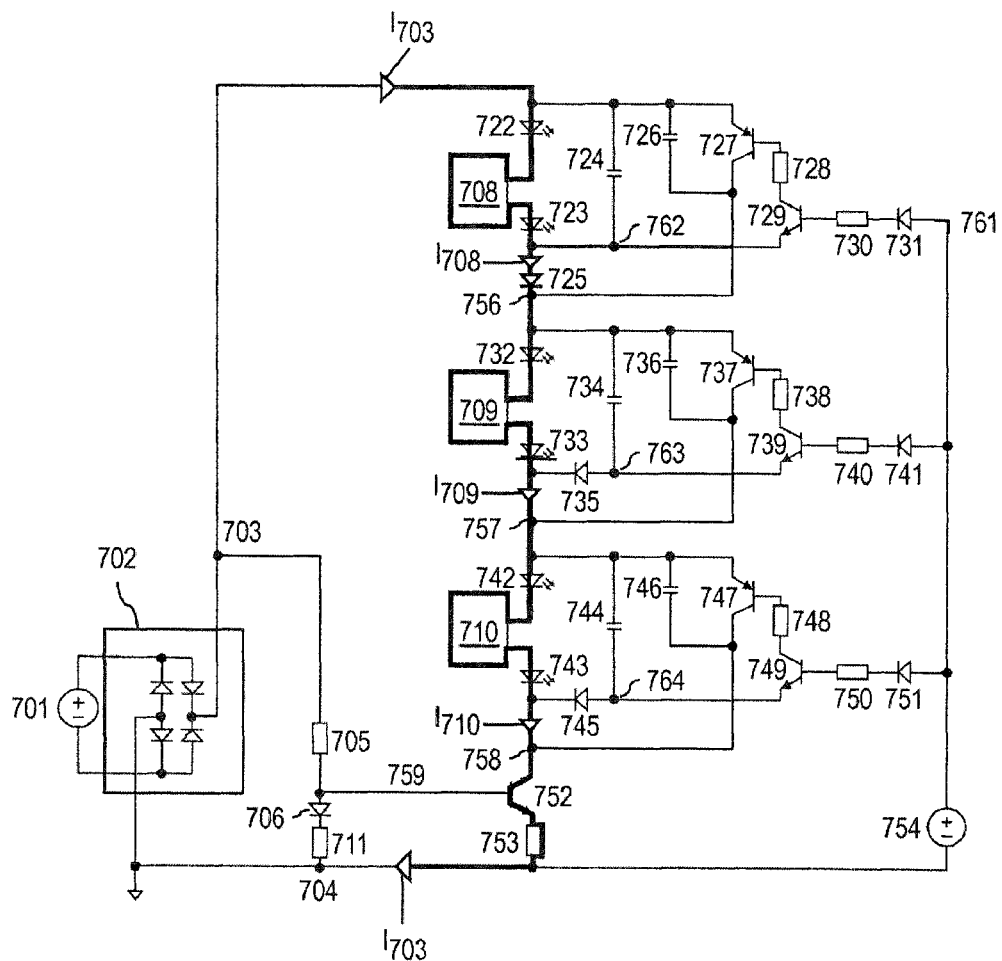
FIG. 10I shows the current characteristic of the circuit shown in FIG. 10A in phase seven.

The current characteristic in phase six is illustrated in FIG. 10H. The condition for phase six is that the base-point voltages $U_{763}$ of the second stage 782 and $U_{762}$ of the third stage 783 are greater than the threshold voltage $U_{754}$, and that only the base-point voltage $U_{764}$ of the first stage 781 is lower than the threshold voltage $U_{754}$. In phase six, the driver transistor 747 is on, and therefore the LEDs in the first stage 781 are bypassed, and none of these LEDs is supplied directly by the current $I_{703}$. Phase five makes the transition to phase six when the base-point voltage $U_{763}$ of the second stage 782 becomes greater than the threshold voltage $U_{754}$. As a result, the diode 741 and the comparison transistors 739 turn off, for which reason the driver transistor 737 also attains a high resistance and allows the current $I_{703}$ to supply the LEDs in the second stage. At the same time, the capacitor 734 is recharged to the present forward voltage of the LEDs in the second stage 782 via a diode 735, which operates as decoupling diode. Once the driver transistor 737 has been turned off, the base-point voltage $U_{764}$ of the first stage 781 jumps to below the threshold voltage $U_{754}$, as a result of which the comparison transistor 749 in the first stage 781 switches on again. Therefore, the driver transistor 747 is also turned on and takes over the current $I_{703}$. Since the current $I_{703}$ supplying the LED increases proportionally to the rectified mains voltage $U_{703}$, at the end of phase six the highest current value occurs, which needs to be passed from one of the three driver transistors. The switching actions of the first and second stages, in particular the sudden change in voltage between phase five and phase six of the voltage $U_{758}$, are picked up by the transistor 752. The switching action of the second stage effects the opposite switching action of the first stage with the lower forward voltage of the associated LEDs, which is between the second stage and the reference point 704.

The current characteristic in phase seven is illustrated in FIG. 10I. The condition for phase seven is that all of the base-point voltages $U_{764}$, $U_{763}$, $U_{762}$ of all stages are greater than the threshold voltage $U_{754}$. In phase seven, none of the driver transistors is on anymore, and therefore the LEDs in all stages are supplied directly by the current $I_{703}$. Phase six makes the transition to phase seven when the base-point voltage $U_{764}$ of the first stage 781 becomes greater than the threshold voltage $U_{754}$. By virtue of the driver transistor 747 switching off, as effected thereby, the voltage $U_{758}$ jumps down to approximately the value of the threshold voltage $U_{754}$, which sudden change in the voltage $U_{758}$ is picked up by the transistor 752. At the same time, the capacitor 744 is recharged to the present forward voltage of the LEDs in the first stage 781 via a diode 745, which operates as decoupling diode. Since this takes place four times in a mains quarter-period, the capacitor 744 can be dimensioned to be smaller than the capacitor 734, which is only recharged twice in the same time interval, and which can in turn be dimensioned to be smaller than the buffer capacitor 724, which is only recharged once in the same time segment.

In the case of a rectified mains voltage $U_{703}$ which becomes lower again, the phases zero to six are run through backwards in analogous fashion. The switching criterion here is when either the base-point voltage $U_{764}$ of the first stage 781 or the base-point voltage $U_{763}$ of the second stage 782 falls below the threshold voltage $U_{754}$. During the transition from phase four to phase three, the base-point voltage $U_{762}$ of the third stage 783 falls below the threshold voltage $U_{754}$.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

LIST OF REFERENCE SYMBOLS 101-103 LED segment
104 Current regulator
105 AC mains voltage
106 Rectifier
SW$_1$ to SW$_3$ (Electronic) switch
C1 to C3 Buffer capacitor
D1 to D3 (Decoupling) diode
301-302 Node
303 Comparator
304-307 Resistor
308 Comparator
309-312 Resistor
313 Comparator
314-317 Resistor
401-403 Voltage source 501 AC mains voltage
502 Rectifier
503-504 Node
505 Diode
506-507 Resistor
508 pnp transistor
509 Voltage source
510-517 Resistor
518-521 Module (LED segment or part of an LED segment)
522a-522d Module (see FIG. 6)
523-528 Connections of module 522a-522d
529-530 Node
531 Resistor
601-603 Diode
604-605 LED
606 Node
607 MOSFET
608 Resistor
609-610 Capacitor
611 npn transistor
612-613 pnp transistor
614-616 Resistor
617 npn transistor
618 Resistor
619 npn transistor
620 Diode
621 Node
701 AC mains voltage
702 Rectifier
703-704 Node
705 Resistor
706 Diode
707-710 Module
711 Resistor
712-713 LED
714 Buffer capacitor
715 Decoupling diode
716 Capacitor
717 pnp transistor
718 Resistor
719 npn transistor
720 Resistor
721 Diode
722-723 LED
724 Buffer capacitor
725 Decoupling diode
726 Capacitor
727 pnp transistor
728 Resistor
729 npn transistor
730 Resistor
731 Diode
732-733 LED
734 capacitor
735 Diode
736 capacitor
737 pnp transistor
738 Resistor
739 npn transistor
740 Resistor
741 Diode
742-743 LED
744 Capacitor
745 Diode
746 Capacitor
747 pnp transistor
748 Resistor
749 npn transistor
750 Resistor
751 Diode
752 npn transistor
753 Resistor
754 Voltage source
755-764 Node
781-784 First to fourth stage
801 AC mains voltage
802 Rectifier
803 Node
805 Node
808-810 Resistor
811 npn transistor
812 Diode
813-816 Module
817-818 LED
819 Buffer capacitor
820 pnp transistor
821 Resistor
822 npn transistor
823 Resistor
824-825 Diode
826-827 LED
828 Buffer capacitor
829 pnp transistor
830 Resistor
831 npn transistor
832 Resistor
833-834 Diode
835-836 LED
837 Buffer capacitor
838 pnp transistor
839 Resistor
840 npn transistor
841 Resistor
842-843 Diode
844-845 LED
846 Buffer capacitor
847 pnp transistor
848 Resistor
849 npn transistor
850 Resistor
851 Diode
852-855 Voltage source
856-864 Node
$U_{703}$ Rectified mains voltage
$U_{756-758}$ Node point voltages
$U_{762-764}$ Base-point voltages of individual stages
$U_{754}$ Threshold voltage
$I_{703}$ Mains current
$I_{708-710}$ Currents through the individual LED segments

The invention claimed is:
1. A circuit for actuating semiconductor light-emitting elements,
wherein the circuit is supplied by a rectified mains voltage,
comprising at least two series-connected segments, which each have one or more series-connected semiconductor light-emitting elements,
wherein the semiconductor light-emitting elements in at least two of the segments are different, which results in different forward voltages of the segments,
comprising in each case one driver for actuating a segment, wherein the driver has at least one electronic switch, by means of which the segment can be bypassed,
wherein the circuit arrangement is designed to decide to bypass the segment assigned to the circuit arrangement, on the basis of an instantaneous value of the rectified mains voltage and on the basis of the bypass state of the adjacent segments, wherein a buffer capacitor is connected in parallel with semiconductor light-emitting elements of at least one segment, wherein a decoupling diode is arranged in series with the at least one segment, and the electronic switch is arranged in parallel with the series circuit comprising the segment and the decoupling diode, with the result that the decoupling diode prevents the discharge of the buffer capacitor via the electronic switch, wherein by actuating the electronic switches, the voltage at the LED segments is controlled to follow the rectified mains voltage.

2. The circuit as claimed in claim 1, wherein the segment with the lower forward voltage is arranged within the series circuit closer to a reference point of the circuit.

3. The circuit as claimed in claim 1, wherein each driver has a peak value detector, which stores the present forward voltage of the segment.

4. The circuit as claimed in claim 3, wherein each driver has a base point, whose potential is dependent on the value of the forward voltage of the segment which is stored in the peak value detector.

5. The circuit as claimed in claim 4, wherein the driver comprises a comparison element, as a result of which each driver switches over the segment assigned thereto whenever the potential difference between the base point and a threshold voltage input into the driver changes its mathematical sign.

6. The circuit as claimed in claim 4, wherein an individual threshold voltage is assigned to each driver.

7. The circuit as claimed in claim 1, wherein at least two of the segments have semiconductor light-emitting elements, which differ at least partially in terms of their forward voltages, their colors, their sizes, their physical shapes and/or their numbers.

8. The circuit as claimed in claim 1, wherein the forward voltages of all of the segments are different.

9. The circuit as claimed in claim 8, wherein the sums of all possible combinations of the forward voltages of subsets of all segments and the forward voltages of the individual segments always result in different values.

10. The circuit as claimed in claim 8, wherein the forward voltages of the series-connected segments double in each case, starting from the segment with the lowest potential, based on the reference point.

11. The circuit as claimed in claim 1, wherein a switchover of a segment which has a greater potential difference than the reference point effects a switchover of at least one segment which has a lower potential difference than the reference point.

12. The circuit as claimed in claim 11, wherein bypassing of a segment which has a greater potential difference than the reference point effects safety isolation of the adjacent segment, which has a lower potential difference than the reference point, and vice versa.

13. The circuit as claimed in claim 1, wherein the segments are connected in series with a current regulator.

14. The circuit as claimed in claim 13, wherein the current regulator has a resistive element or a linear regulator.

15. The circuit as claimed in claim 1, wherein the electronic switch of the driver with the greatest potential difference with respect to the reference point is active with a switching frequency which corresponds to twice the mains frequency, and wherein electronic switches of further stages are active at a switching frequency which is a multiple of twice the mains frequency.

16. The circuit as claimed in claim 1, wherein at least one of the drivers has a series circuit comprising a capacitor and a diode, wherein this series circuit is arranged in parallel with the semiconductor light-emitting elements of the segment which is actuated by the driver.

17. The circuit as claimed in claim 1, wherein the buffer capacitor is designed to be replaceable via a detachable connection.

18. The circuit as claimed in claim 1,
wherein the driver comprises an electronic short-circuiting switch, by means of which the segment assigned to the driver can be short-circuited,
wherein the base connection of the short-circuiting switch is connected to the collector connection of an electronic comparison switch via a first current-limiting element,
wherein the emitter connection of the comparison switch is connected to a connection of the segment, to which the driver is assigned,
wherein the base connection of the comparison switch is connected to a terminal of the rectified AC mains voltage.

* * * * *